United States Patent
Sugiyama

(10) Patent No.: US 7,751,656 B2
(45) Date of Patent: Jul. 6, 2010

(54) OPTICAL MODULATOR

(75) Inventor: Masaki Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/025,347

(22) Filed: Feb. 4, 2008

(65) Prior Publication Data

US 2008/0193074 A1    Aug. 14, 2008

(30) Foreign Application Priority Data

Feb. 8, 2007    (JP)    ............... 2007-028784

(51) Int. Cl.
*G02F 1/35*    (2006.01)
(52) U.S. Cl. .......................... 385/2; 359/251
(58) Field of Classification Search ............ 385/2, 385/3
See application file for complete search history.

(56) References Cited

U.S. PATENT DOCUMENTS

| | | | | |
|---|---|---|---|---|
| 4,693,549 A * | 9/1987 | Cheo | .............................. | 385/9 |
| 4,973,140 A * | 11/1990 | Cheo et al. | ................... | 359/245 |
| 5,138,480 A * | 8/1992 | Dolfi et al. | .................... | 359/251 |
| 5,416,859 A * | 5/1995 | Burns et al. | ..................... | 385/3 |
| 5,422,966 A * | 6/1995 | Gopalakrishnan et al. | ....... | 385/2 |
| 5,455,876 A * | 10/1995 | Hopfer et al. | ................... | 385/2 |
| 5,502,780 A * | 3/1996 | Rangaraj | ....................... | 385/3 |
| 5,563,965 A * | 10/1996 | Madabhushi | .................... | 385/2 |
| 5,617,493 A * | 4/1997 | Nishimoto | .................... | 385/40 |
| 5,748,358 A * | 5/1998 | Sugamata et al. | ........... | 359/245 |
| 5,764,822 A * | 6/1998 | Madabhushi | ................. | 385/14 |
| 5,790,719 A * | 8/1998 | Mitomi et al. | ................. | 385/2 |
| 5,841,568 A * | 11/1998 | Miyakawa | ................... | 359/245 |
| 5,982,958 A * | 11/1999 | Minowa et al. | ................. | 385/2 |
| 6,222,965 B1 * | 4/2001 | Smith | ........................... | 385/40 |
| 6,304,685 B1 * | 10/2001 | Burns | .............................. | 385/3 |
| 6,356,673 B1 * | 3/2002 | Burns | .............................. | 385/2 |
| 6,411,747 B2 * | 6/2002 | Rangaraj | ........................ | 385/2 |
| 6,473,547 B2 * | 10/2002 | Longone | ....................... | 385/40 |
| 6,526,186 B2 * | 2/2003 | Burns | .............................. | 385/2 |
| 6,700,691 B2 * | 3/2004 | Nespola et al. | ............. | 359/254 |
| 6,721,085 B2 * | 4/2004 | Sugiyama et al. | ........... | 359/322 |
| 6,741,378 B2 * | 5/2004 | Sugiyama et al. | ........... | 359/245 |

(Continued)

FOREIGN PATENT DOCUMENTS

JP    11-38244    2/1999

(Continued)

*Primary Examiner*—Charlie Peng
*Assistant Examiner*—Peter Radkowski
(74) *Attorney, Agent, or Firm*—Staas & Halsey LLP

(57) ABSTRACT

An optical modulator comprising; an optical waveguide in which input light propagates; a signal electrode having an end portion in which signal microwave is input and having an interaction area in which the signal microwave interacts with the light propagating in the optical waveguide; and, a ground electrode forming a coaxial structure with the signal electrode, wherein, width of the end portion is greater than width of the interaction area and thickness of the end portion is less than thickness of the interaction area.

Also disclosed is an optical modulator, further comprising a substrate having an electro-optic effect; and, a buffer layer on the substrate, wherein, the signal electrode and ground electrode are formed on the buffer layer, and thickness of the buffer layer near the end portion of the signal electrode is greater than thickness of the buffer layer near the interaction area.

31 Claims, 22 Drawing Sheets

U.S. PATENT DOCUMENTS

| | | | |
|---|---|---|---|
| 6,760,493 B2 * | 7/2004 | Pruneri et al. | 385/8 |
| 6,865,306 B2 * | 3/2005 | Doi et al. | 385/14 |
| 6,867,901 B2 * | 3/2005 | Sugiyama et al. | 359/322 |
| 7,027,668 B2 * | 4/2006 | Tavlykaev et al. | 385/2 |
| 7,068,863 B2 * | 6/2006 | Kondo et al. | 385/2 |
| 7,079,714 B2 * | 7/2006 | Chowdhury et al. | 385/3 |
| 7,133,578 B2 * | 11/2006 | Doi | 385/3 |
| 7,224,869 B2 * | 5/2007 | Cole et al. | 385/40 |
| 2002/0106141 A1 * | 8/2002 | Gopalakrishnan | 385/2 |
| 2002/0126934 A1 * | 9/2002 | Burns | 385/2 |
| 2002/0146190 A1 * | 10/2002 | Doi et al. | 385/14 |
| 2003/0031400 A1 * | 2/2003 | Pruneri | 385/14 |
| 2003/0044100 A1 * | 3/2003 | Kondo et al. | 385/3 |
| 2003/0147575 A1 * | 8/2003 | Sugiyama et al. | 385/2 |
| 2003/0147576 A1 * | 8/2003 | Doi et al. | 385/3 |
| 2003/0151793 A1 * | 8/2003 | Sugiyama et al. | 359/279 |
| 2003/0228081 A1 * | 12/2003 | Tavlykaev et al. | 385/3 |
| 2004/0066549 A1 * | 4/2004 | Kiehne et al. | 359/254 |
| 2005/0013522 A1 * | 1/2005 | Doi | 385/3 |
| 2005/0201686 A1 * | 9/2005 | Cole et al. | 385/40 |
| 2006/0210212 A1 * | 9/2006 | Sugiyama | 385/3 |
| 2007/0081766 A1 * | 4/2007 | Aoki et al. | 385/40 |
| 2007/0165977 A1 * | 7/2007 | Cole et al. | 385/8 |
| 2008/0031564 A1 * | 2/2008 | Sugiyama | 385/9 |
| 2008/0056637 A1 * | 3/2008 | Sugiyama | 385/3 |
| 2008/0089633 A1 * | 4/2008 | Moeller et al. | 385/2 |

FOREIGN PATENT DOCUMENTS

| | | |
|---|---|---|
| JP | 2003-66394 | 3/2003 |
| JP | 2003-233044 | 8/2003 |

* cited by examiner

PRIOR ART

PRIOR ART

US 7,751,656 B2

OPTICAL MODULATOR

The present invention claims foreign priority to Japanese application 2007-028784, filed on Feb. 8, 2007, which is incorporated herein by reference in its entirety.

FIELD OF THE INVENTION

The present invention relates to an optical waveguide formed on a substrate having an electro-optic effect and an optical modulator having electrodes.

DESCRIPTION OF THE RELATED ART

In recent years, optical waveguide devices wherein an optical waveguide is formed on an electro-optic crystal such as a $LiNbO_3$ substrate or a $LiTaO_2$ substrate are used as optical modulators in high speed optical communication systems, such as high speeds of 40 Gbps (for example, shown in Japanese Laid Open Publication of JP2003-233044). An optical modulator using optical waveguide device is formed by thermally diffusing a metallic film formed on part of an electro-optic crystal board, or by performing proton exchanges in benzoic acid after patterning to form the optical waveguide and then forming electrodes near the optical waveguide that is formed.

FIG. 35 is a plan view of a conventional optical modulator. An optical modulator 3500 is an optical modulator that performs a phase modulation on incoming light with static intensity. As shown in FIG. 35, an optical waveguide 3520 is formed on an electro-optic crystal board 3510, and a signal electrode 3530 is formed along the optical waveguide 3520. Also, ground electrodes 3540 and 3550 are formed on either side of the signal electrode 3530. The signal electrode 3530 and the ground electrodes 3540 and 3550 form a coplanar line.

Microwaves output from a drive circuit 3570 via a relay board 3560 are input from the end of the signal electrode 3530 and then propagate the signal electrode 3530. At an interaction area of the optical waveguide 3520 and the signal electrode 3530, the refractive index of the optical waveguide 3520 is changed by the effect of the electric field of the microwaves, which propagate the optical waveguide 3520. Thus, the light which propagates the optical waveguide 3520 is phase modulated according to the microwaves that propagate the signal electrode 3530.

FIG. 36 is a plan view of another conventional optical modulator. In FIG. 36, the same symbols are used to indicate a similar configuration to which indicated in FIG. 35. The optical modulator 3600 shown in FIG. 36 is a Mach-Zehnder optical modulator that performs intensity modulation on light with static intensity. An input waveguide 3610, parallel waveguides 3620a and 3620b, and an output waveguide 3630 are formed on the electro-optic crystal board 3510. The signal electrode 3530 is formed along the parallel waveguide 3620a.

Also, the ground electrode 3550 is formed along the parallel waveguide 3620b. At an interaction area of the parallel waveguide 3620a and the signal electrode 3530, the refractive index of the parallel waveguide 3620a is changed by the effect of the electric field of the microwaves which propagate the parallel waveguide 3620a. Thus, the light which propagates the parallel waveguide 3620a is phase modulated according to the microwaves that propagate the signal electrode 3530. The light which is output from the output waveguide 3630 is intensity modulated according to the phase of the light which propagates the parallel waveguide 3620a.

FIG. 37 is a plan view which shows a part of another conventional optical modulator. In FIG. 37, the same symbols are used to indicate a similar configuration to that indicated in FIG. 36. As shown in FIG. 37, a signal pad 3530a with the width W is usually formed on the end of the signal electrode 3530 to facilitate wire bonding. In this case, a wide gap S is formed between the signal pad 3530a and the ground electrodes 3540 and 3550 to match characteristic impedance in the signal pad 3530a.

SUMMARY

Disclosed are embodiments relating to an optical modulator, comprising; an optical waveguide in which input light propagates; a signal electrode having an end portion in which signal microwave is input and having an interaction area in which the signal microwave interacts with the light propagating in the optical waveguide; and, a ground electrode forming a coaxial structure with the signal electrode, wherein, width of the end portion is greater than width of the interaction area and thickness of the end portion is less than thickness of the interaction area.

The subject matter which is regarded as the invention is particularly pointed out and distinctly claimed in the concluding portion of the specification. The invention, however, together with further objects and advantages thereof, may best be understood by reference to the following description taken in conjunction with the accompanying drawings.

DESCRIPTION OF THE PREFERRED EMBODIMENTS

Figure 1:
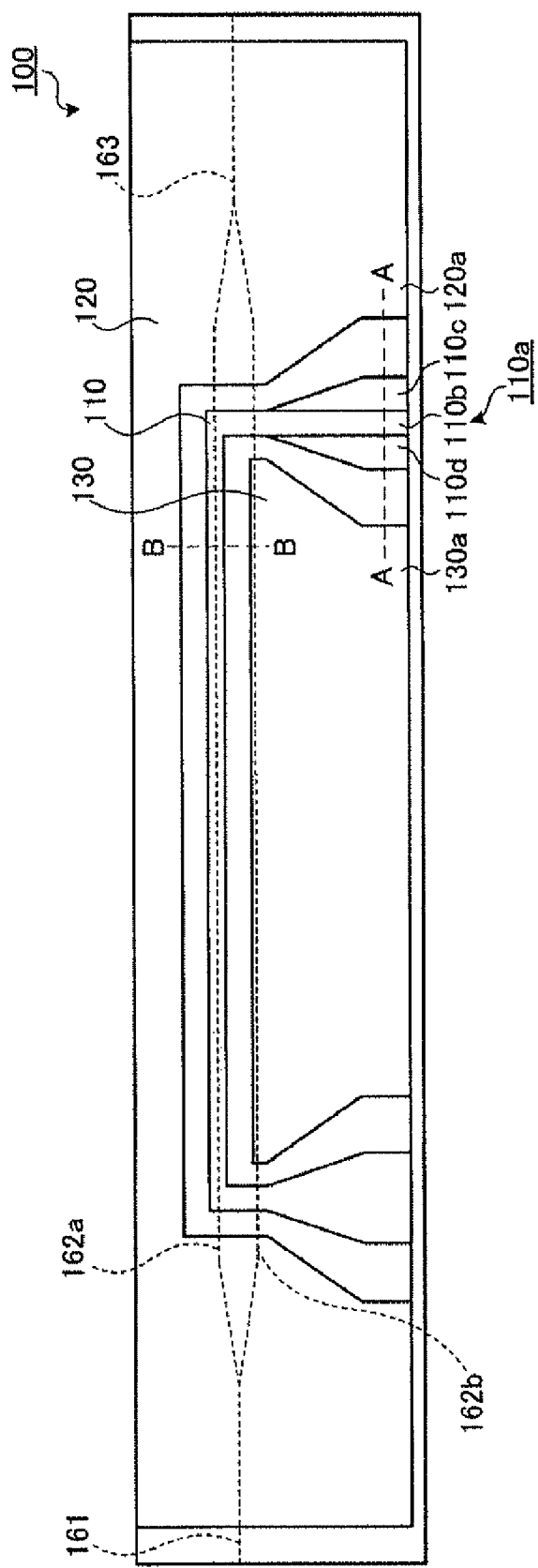
FIG. 1 is a plan view of an optical modulator according to the embodiment.

Reference will now be made in detail to embodiments of the present invention, examples of which are illustrated in the accompanying drawings, wherein like reference numerals refer to like elements throughout.

Figure 36:
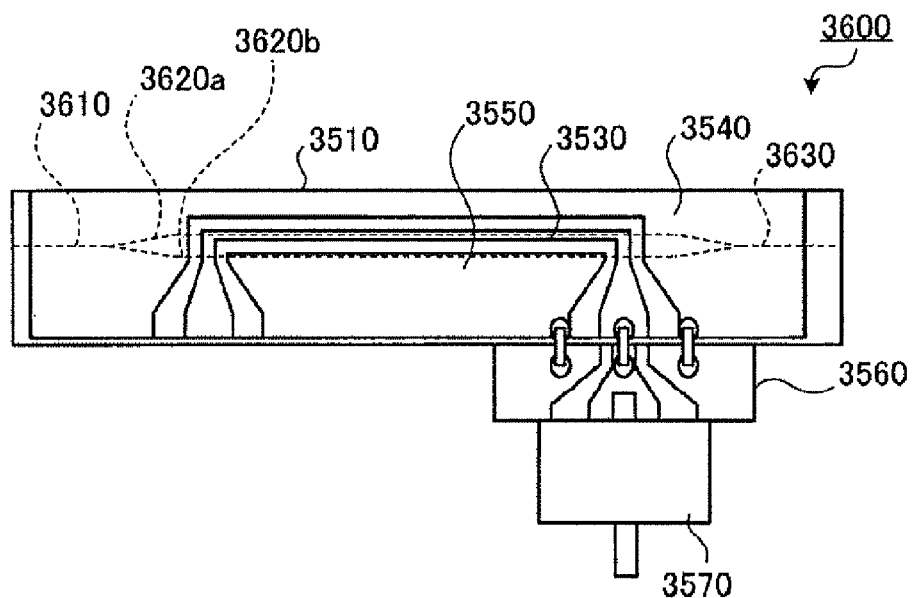
FIG. 36 is a plan view showing another conventional optical modulator.
Figure 37:
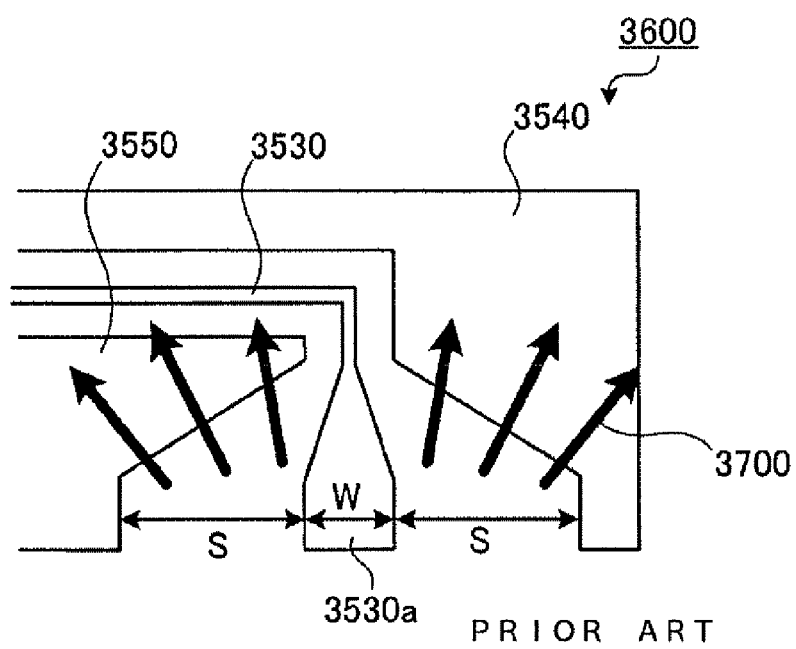
FIG. 37 is a plan view showing part of another conventional optical modulator.
Figure 38:
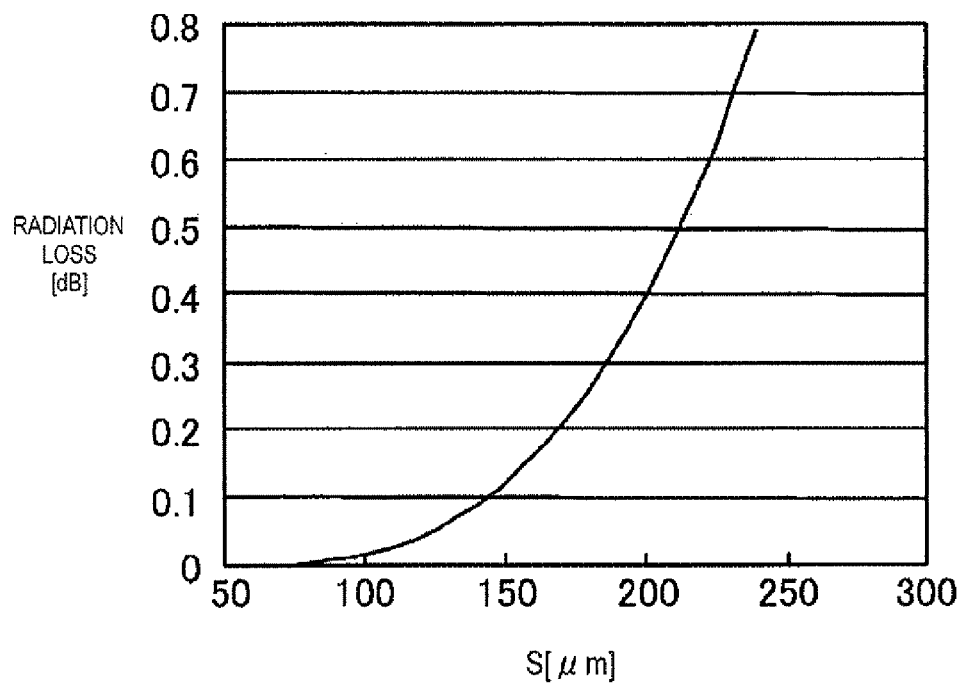
FIG. 38 is a diagram showing the relationship between the gap S and radiation loss.

In FIG. 36 or FIG. 37, if the gap S, the gap between the signal pad 3530a and the ground electrodes 3540 or 3550, is widened, the radiation of microwaves (3700 in FIG. 37) increases and radiation loss of the microwaves increases. FIG. 38 is a diagram showing a relationship between the gap S and radiation loss. As shown in FIG. 38, radiation loss [dB] increases as the gap S, the gap between the signal pad 3530a and the ground electrodes 3540 and 3550, increases.

Figure 39:
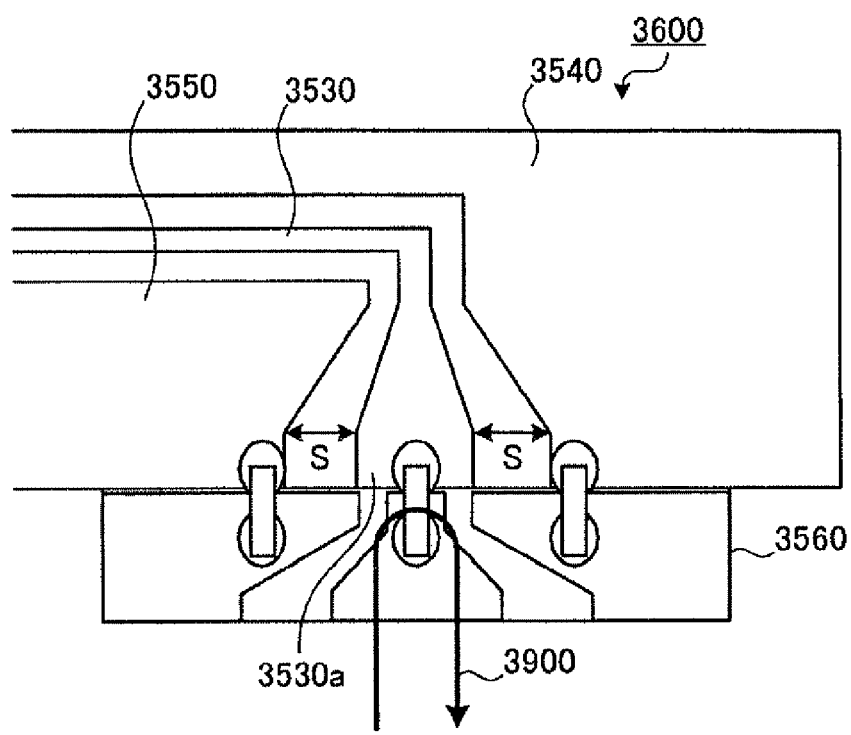
FIG. 39 is a plan view showing part of a modification of another conventional optical modulator.

On the other hand, if the gap S is narrowed, reflection loss of microwaves increases. FIG. 39 is a plan view showing part of an optical modulator with modification of another conventional optical modulator. In FIG. 39, the same symbols are used to indicate a similar configuration in FIG. 37 and FIG. 39.

As shown in FIG. 39, when the gap S, the gap between the signal pad 3530a and the ground electrodes 3540 or 3550, is narrowed, it becomes impossible to match the characteristic impedance of the signal pad 3530a to specific value (for example, 50 ohm). Change of characteristic impedance of the signal pad 3530a results in microwaves reflection at the signal pad 3530a, as shown by symbol 3900, and thereby increased reflection loss of the microwaves.

Figure 40:
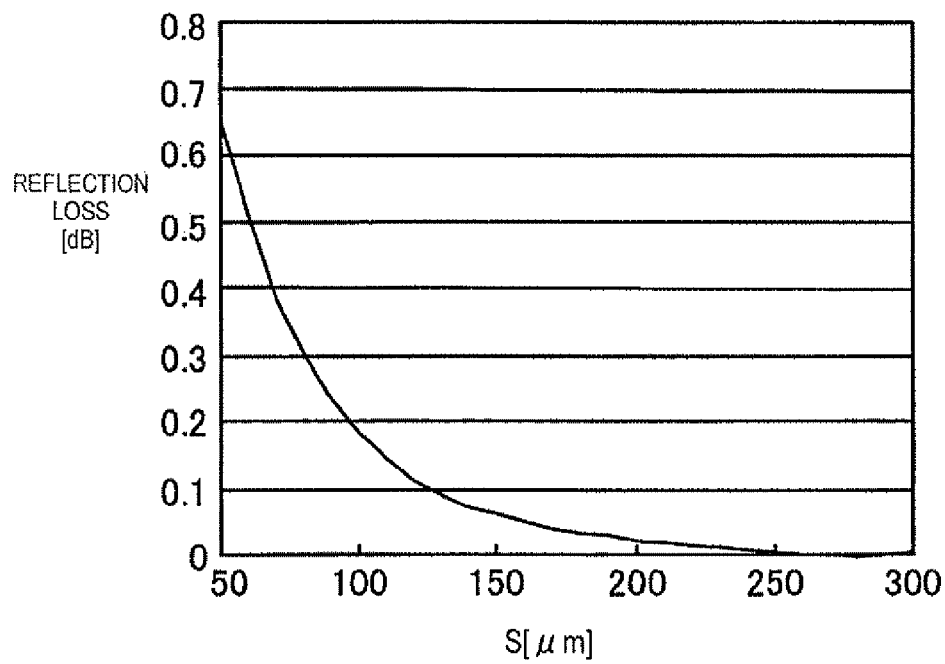
FIG. 40 is a diagram showing the relationship between the gap S and reflection loss.

FIG. 40 is a diagram showing the relationship between the gap S and the reflection loss. As shown in FIG. 40, the smaller the gap S between the signal pad 3530a and the ground electrodes 3540 or 3550 is, the greater the reflection loss [dB] is.

Figure 41:
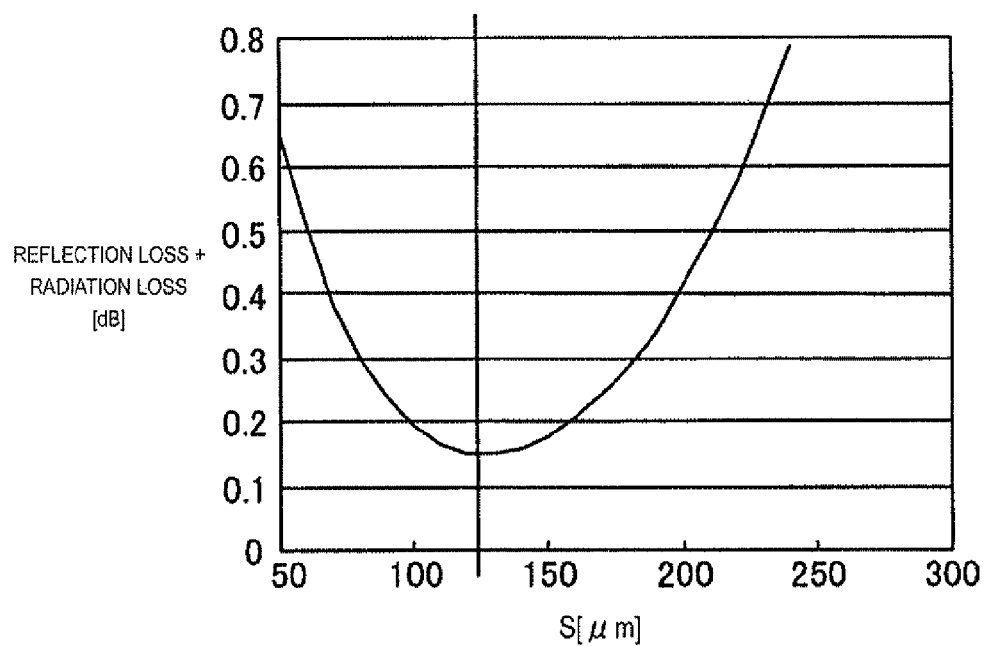
FIG. 41 is a diagram showing the relationship between gap S and the sum of the reflection loss and the radiation loss.

Therefore, the radiation loss is increased when gap S is increased, and the reflection loss is increased when gap S is decreased. Following that, it is possible to set the gap S, the gap between the signal pad 3530a and the ground electrodes 3540 or 3550, to minimize the sum of the reflection loss and the radiation loss. [0016] FIG. 41 is a diagram showing the relationship between gap S and the sum of the reflection loss and the radiation loss. As shown in FIG. 41, the sum of the reflection loss and the radiation loss is minimized when gap S, the gap between the signal pad 3530a and the ground electrodes 3540 or 3550, is 130 micrometer.

However, when the optical modulator 3600 is operated at a high speed, such as 40 Gbps, microwaves returned to a drive circuit has an adversely affect and causes modulation performance degradation. Thus, even if the sum of the reflection loss and the radiation loss is minimized, the microwave reflection caused by the characteristic impedance mismatch at signal pad 3530a is still a problem.

Figure 42:
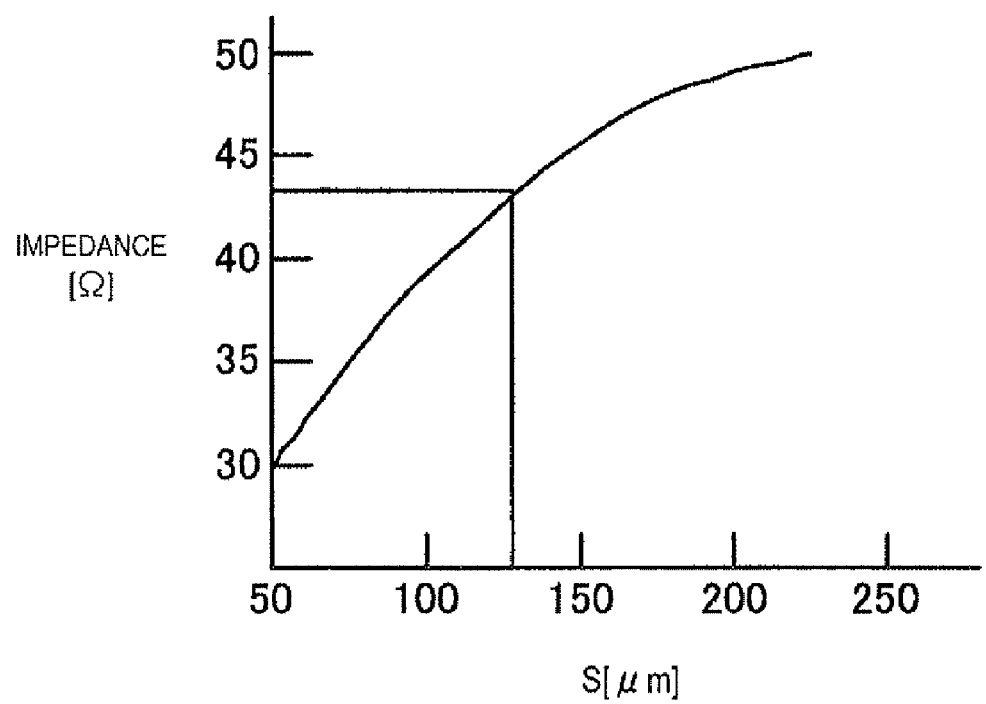
FIG. 42 is a diagram showing the relationship between gap S and the impedance.

FIG. 42 is a diagram showing a relationship between gap S and the impedance. As shown in FIG. 42, the impedance [ohm] at the signal pad 3530a increases as gap S, the gap between the signal pad 3530a and the ground electrodes 3540 or 3550, is increased. When the gap S is set to 130 micrometer, which minimizes the sum of the reflection loss and the radiation loss, the impedance at signal pad 3530a is 43 ohm and do not match the characteristic impedance (50 ohm) and microwave reflection occurs.

Thus, with the structure of aforementioned related technologies, it is difficult to both decrease the gap S to reduce the radiation loss of the microwaves, and keep the characteristic impedance at the signal pad 3530a matched to decrease the reflection loss of microwaves. As the reflection loss of the microwaves increases, microwaves returned to a drive circuit 3560 increases, adversely effect to the drive circuit 3560 increases, and the modulation performance of the optical modulator 3600 degradation increases.

Figure 2:
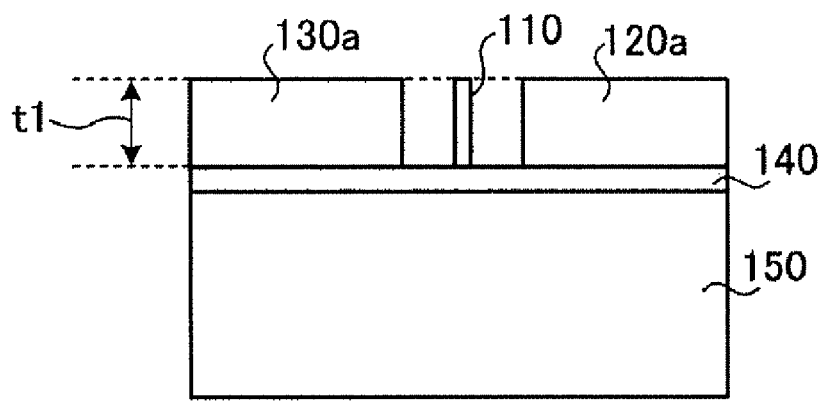
FIG. 2 is a cross-sectional diagram of line A-A in FIG. 1.
Figure 3:
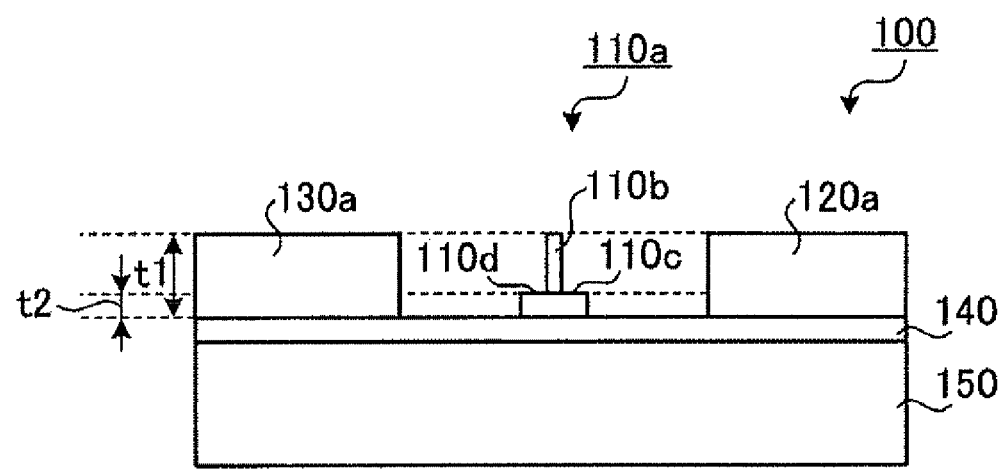
FIG. 3 is a cross-sectional diagram of line B-B in FIG. 1.

FIG. 1 is a plan view showing an optical modulator according to an embodiment of the present invention. FIG. 2 is a cross-sectional diagram of line A-A in FIG. 1. FIG. 3 is a cross-sectional diagram of line B-B in FIG. 1.

As shown in FIG. 1 through FIG. 3, the optical modulator 100 has a signal electrode 110, a ground electrode 120, a ground electrode 130, a buffer layer 140, and a substrate 150. The optical modulator 100 is a Mach-Zehnder optical modulator that performs intensity modulation on light with static intensity. The substrate 150 is a ferroelectric material such as $LiNbO_3$ or $LiTaO_2$, having an electro-optic effect.

As shown by the dotted line in FIG. 1, an input waveguide 161, parallel waveguides 162a and 162b, and an output waveguide 163 are formed on the substrate 150. The light entered in the input waveguide 161 is split, and is then output to the parallel waveguides 162a or 162b. Light that propagates the parallel waveguides 162a or 162b is combined, and is then output from the output waveguide 163. In FIG. 2 and the subsequent figures, the input waveguide 161, the parallel waveguide 162a, the parallel waveguide 162b, and the output waveguide 163 are not shown.

The buffer layer 140 is formed on one side of the substrate 150. The buffer layer 140 is formed by a layer that transmits light. Disposed at intervening position between the substrate 150 and the electrodes of the signal electrode 100, the ground electrode 120, or the ground electrode 130, the buffer layer 140 prevents optical loss of the light that propagates the parallel waveguides 162a or 162b, which are formed on the substrate 150. The loss is caused by a light absorption by the electrodes of the signal electrode 110, the ground electrode 120, or the ground electrode 130. $SiO_2$ with a thickness of 0.21 micrometer, for example, is used in the buffer layer 140.

The signal electrode 110 is formed on the buffer layer 140 along the parallel waveguide 162a, which is formed on the substrate 150. The ground electrode 130 is formed on the buffer layer 140 along the parallel waveguide 162b, which is formed on the substrate 150. When using a Z cut substrate as the substrate 150, the signal electrode 110 and the ground electrode 130 are positioned above the parallel waveguides 162a and 162b to utilize the refractive index variation of a Z direction electric field. Hereinafter, the portion of the signal electrode 110 and the ground electrode 130 that is formed along the parallel waveguide 162a and the parallel waveguide 162b will be referred to as the interaction area.

The ground electrode 120 and the ground electrode 130 are formed on the buffer layer 140 and formed on either side of the signal electrode 110. The widths of the ground electrode 120 and the ground electrode 130 are sufficiently wide compared to the signal electrode 110. The ground electrode 120 and the ground electrode 130 comprise a coaxial structure with the signal electrode 110. The signal electrode 110, the ground electrode 120, and the ground electrode 130 form a coplanar line.

The end of the signal electrode 110 extends to the end of the substrate 150. The width of the end of the signal electrode 110 is wider than the width of the interaction area of the signal electrode 110, the interaction area with the parallel waveguide 162a. A signal pad 110a is an end portion of the signal electrode 110 with which the width is greater than the width of the interaction area. The signal pad 110a is connected to signal lines of other circuits by bonding, such as wire bonding.

Because the ground electrode 120 and the ground electrode 130 are sufficiently wider than the signal electrode 110, a ground pad 120a or a ground pad 130a, which are portions of the ground electrode 120 or the ground electrode 130 in the proximity of the signal pad 110, are used to connect the ground electrodes of 120 or 130 to ground lines of other circuits by bonding, such as wire bonding.

As shown in FIG. 2, the thickness of the electrodes in the interaction area is t1. That is, for the electrodes of the ground electrode 120, the ground electrode 130, or the parallel waveguide 162a, the thickness of interaction areas with the signal electrode 110 is t1. As shown in FIG. 3, the thickness of the center portion 110b of the signal pad 110a is also t1. For a portion 110c, which is a part of the signal pad 110a and in a proximity of the ground pad 120a, and for a portion 110d, which is a part of the signal pad 110a and in a proximity of the ground pad 130a, the thickness of the portion 110c and portion 110d is t2 (<t1). The thickness of the ground pad 120a and the ground pad 130a is t1.

Thus, for at least some portion of the signal pad 110a, the thickness of the signal pad 110a is less than the thickness of the electrodes in the interaction area in the optical modulator 100 in the embodiment. Also, the thickness of the part of the signal pad 100a that are in proximity of the ground pad 120a or the ground pad 130a is less than the thickness of the electrodes in the interaction area.

When driving the optical modulator 100 at a high speed, a microwave signal is applied to the signal pad 110a with a termination device and light with static intensity is input to the input waveguide 161. The termination device is connected via resistance to the one end of the signal electrode 110, the end is opposite side of the signal pad 110a in the signal electrode 110. By applying the microwave signal, the refractive indexes of the parallel waveguide 162a and the parallel waveguide 162b change by +Δna and −Δna, respectively, at the interaction area.

By changing the reflective indexes of the parallel waveguides of 162a and 162b, phase difference between the light which propagates the parallel waveguide 162a and the light which propagates the parallel waveguide 162b is changed, and then signal light with its intensity modulated outputs from the output waveguide 163. Also, by matching the speed of light and microwave, it is possible to obtain a wide bandwidth of optical response characteristics for the optical modulator. The matching of the speed can be performed by changing the cross-section geometry of the electrodes and thereby controlling the effective refractive index of microwaves.

Thus, the impedance at the signal pad 110a can be increased, up to 50 ohm for example, without increasing the gap S, the gap between the signal pad 110a and the ground pad 120a or the ground pad 130a (keeping the gap less than 130 micrometer, for example). Therefore, the optical modulator 100 according to the embodiment can facilitate connections between characteristic impedance and a drive circuit while matching characteristic impedance without increasing radiation loss even when operating at high speed.

Figure 4:
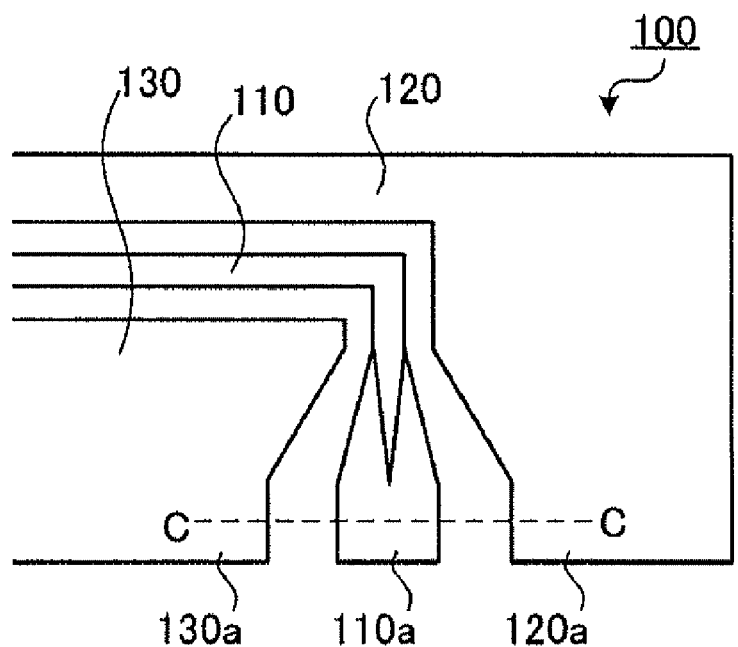
FIG. 4 is a plan view showing part of an optical modulator according to a modification 1 of the embodiment.
Figure 5:
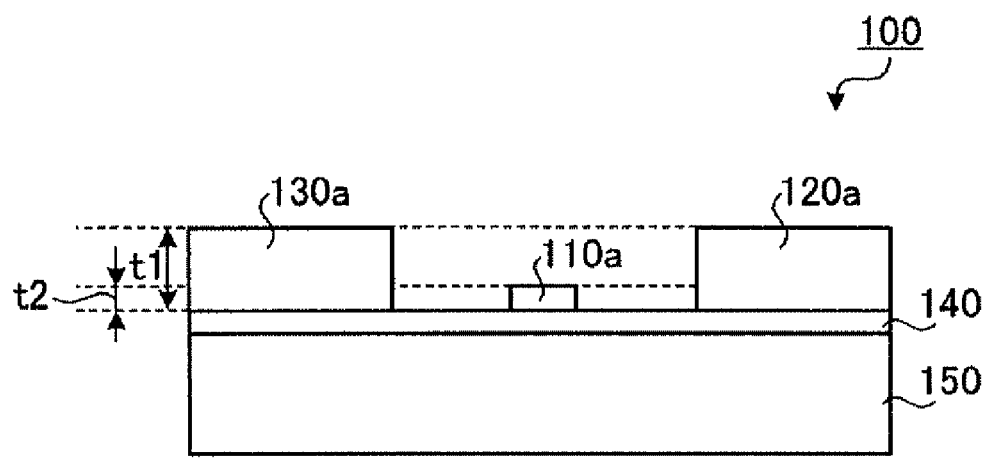
FIG. 5 is a cross-section diagram of line C-C in FIG. 4.

FIG. 4 is a plan view showing part of an optical modulator according to a modification 1 of the embodiment. FIG. 5 is a cross-section diagram of line C-C in FIG. 4. In FIG. 4 and FIG. 5, the same symbols are used to indicate a similar configuration to that indicated in FIG. 1 through FIG. 3. As shown in FIG. 4 and FIG. 5, in the modification 1 of the optical modulator 100, the thickness of the entire signal pad 110a in the signal electrode 110 is less than the thickness of the interaction area.

More specifically, the thickness of the entire signal pad 110a is t2 (<t1). The thickness of the ground pad 120a and the ground pad 130a is t1. With this configuration, the impedance in the signal pad 110a can be increased further without increasing the gap S, the gap between the signal pad 110a and the ground pad 120a or the ground pad 130a. In the optical modulator 1 according to the modification 1 of the embodiment, while facilitating connections to the drive circuit, the characteristic impedance can be matched without increasing the radiation loss even when operating at high speed.

Figure 6:
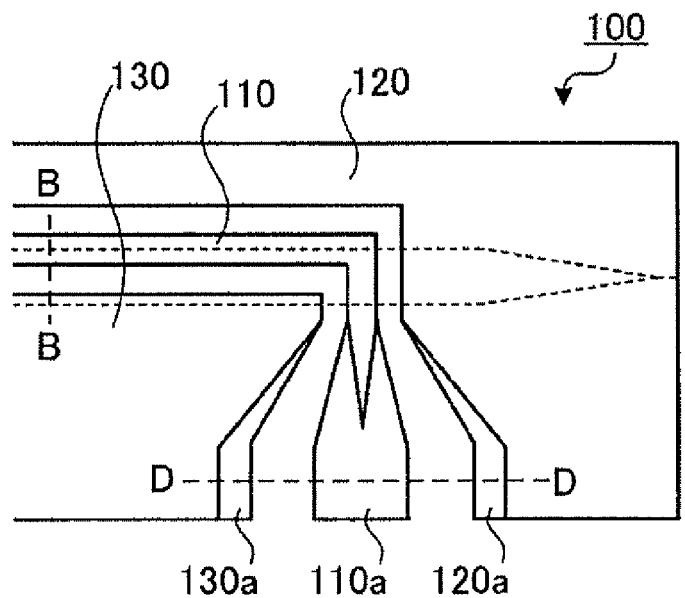
FIG. 6 is a plan view showing part of an optical modulator according to a modification 2 of the embodiment.
Figure 7:
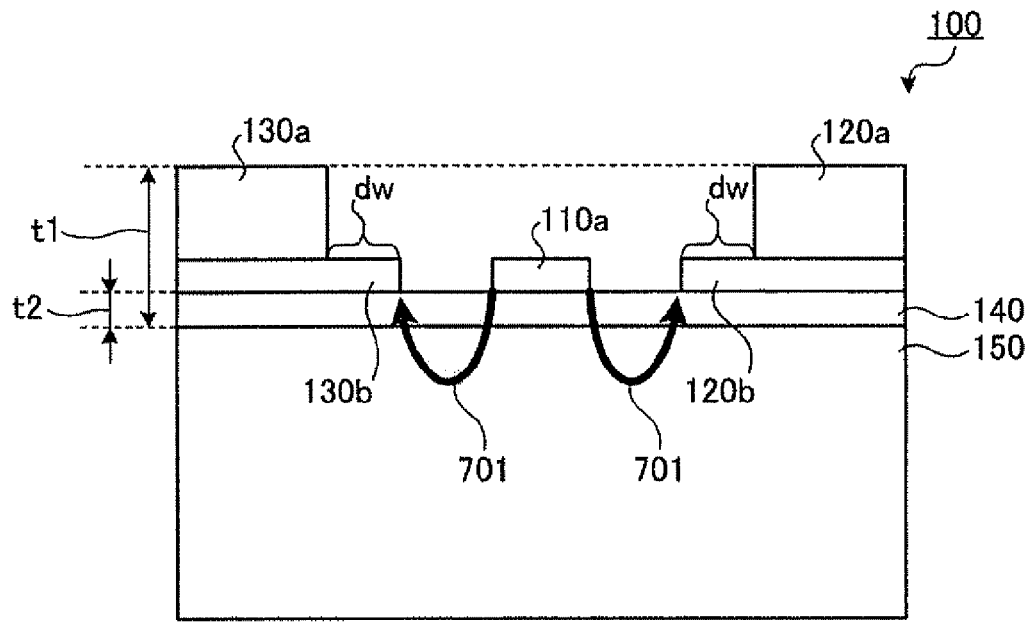
FIG. 7 is a cross-section diagram of line D-D in FIG. 6.

FIG. 6 is a plan view showing part of an optical modulator according to a modification 2 of the embodiment. FIG. 7 is a cross-section diagram of line D-D in FIG. 6. In FIG. 6 and FIG. 7, the same symbols are used to indicate a similar configuration to that indicated in FIG. 4 and FIG. 5. As shown in FIG. 6 and FIG. 7, in the optical modulator 100 of modification 2, the thickness of part of the ground pad 120a or the ground pad 130a, which are in proximity of the signal pad 110a, and the thickness of the signal pad 110a are less than that of the electrodes in the interaction area.

Specifically, as shown in FIG. 7, the thickness of the signal pad 110a is t2 (<t1). The thickness of the portion 120b, which is a part of the ground pad 120a and in the proximity of the signal pad 110a, is t2. The thickness of the portion 130b, which is a part of the ground pad 130a and in the proximity of the signal pad 110a, is t2. Here, even if the thickness of the portion 120b and 130b, which are part of the ground pad 120a or the ground pad 130a, is decreased, radiation loss can be suppressed with an electric field 701 of the signal pad 110a unexpanded.

Thus, the impedance in the signal pad 110a can be further increased without increasing the gap S, the gap between the signal pad 110a and the ground pad 120a or the ground pad 130a. In the optical modulator 100 according to the modification 2 of the embodiment, while facilitating connections to the drive circuit, the characteristic impedance can be matched without increasing the radiation loss even when the modulator is operating at a high speed.

The thickness of the signal pad 110a, the portion 120b, and the portion 130b are both t2. Thus, the signal pad 110a, the portion 120b, and the portion 130b can be created at the same time by patterning.

Thus, the optical modulator 100 can be manufactured by the two following simplified manufacturing process: the first film forming process forming the portion 120b of the ground pad 120a and the portion 130b of the ground pad 130a; and the second film forming process forming the portions of the ground pad 120a and the ground pad 130a having a larger thickness.

When the thickness of the signal pad 110a, the portion 120b, and 130b is decreased, there is a difference in height (t1 and t2) within the signal pad 110a, the ground pad 120a and the ground pad 130a. Thus, there could be some cases that contacting the probe is difficult when measuring the high frequency characteristics. The tip of a high frequency probe (i.e., 40 G) is especially susceptible to damage due to differences in height at the point of contact. Due to their good characteristics and operability, 40 G probes with a space of from 100 to 400 micrometer between the ground and the signal are used often.

Therefore, when the thickness of the signal pad 110a, the portion 120b, and 130b is decreased, the width dw of the portion 120b and 130b is 100 micrometer or larger. Setting the width dw to this, the probe and the ground can be in contact with the portion 120b and 130b. Also, as the thickness of the portion 120b and 130b are both t2, the setting allows probe stable contact with the ground.

In the optical modulator 100 according to the embodiment, the modification 1 of the embodiment, and the modification 2 of the embodiment, the gap S, the gap between the signal pad 110a and the ground pad 120a or the ground pad 130a, is formed to continuously increase in accordance with the width of the signal pad 110a. By continuously changing the gap S this way, impedance mismatches in the signal pad 110a can be suppressed.

Also, for the portions in the signal pad 110a, the ground pad 120a, or the ground pad 130a, in which the thickness is less, widths of the portions are formed to continuously increase in accordance with the width of the signal pad 110a. By continuously changing the width of the portion this way, impedance mismatches in the signal pad 110a can be suppressed.

Also, the optical modulator 100 according to the modification 1 and modification 2 of the embodiment it is preferable for the thickness (t2) of the signal pad 110a to be made less than the thickness (t1) of the interaction area with the parallel waveguide 162a and be 1 micrometer or greater. Thus, it is possible to get sufficient strength for bonding to the signal pad 110a.

Figure 8:
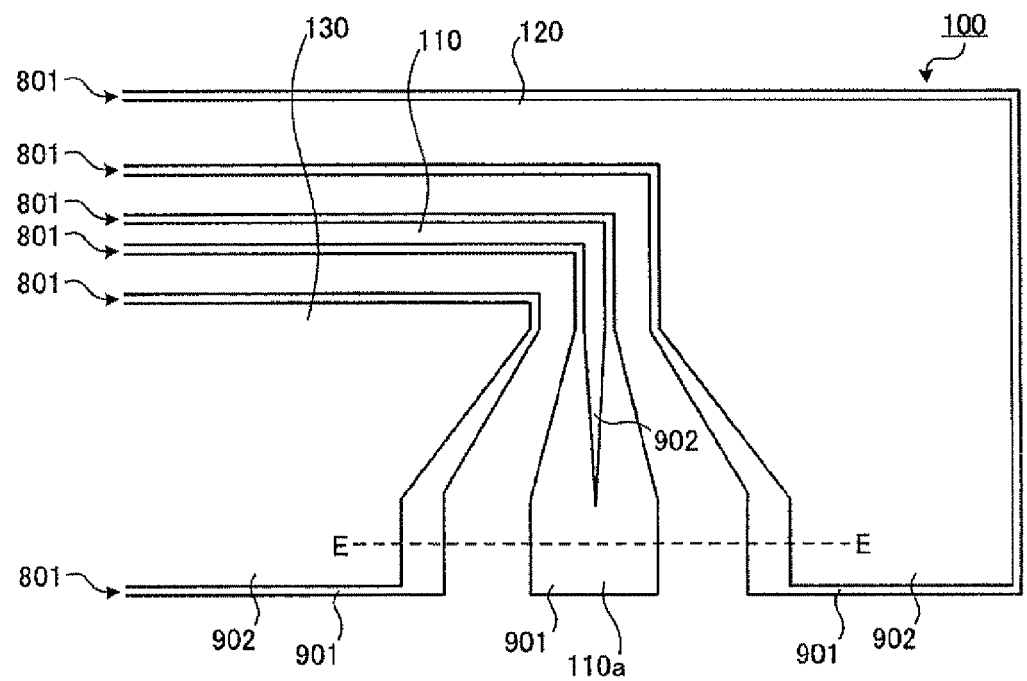
FIG. 8 is a plan view showing part of an optical modulator according to a modification 3 of the embodiment.
Figure 9:
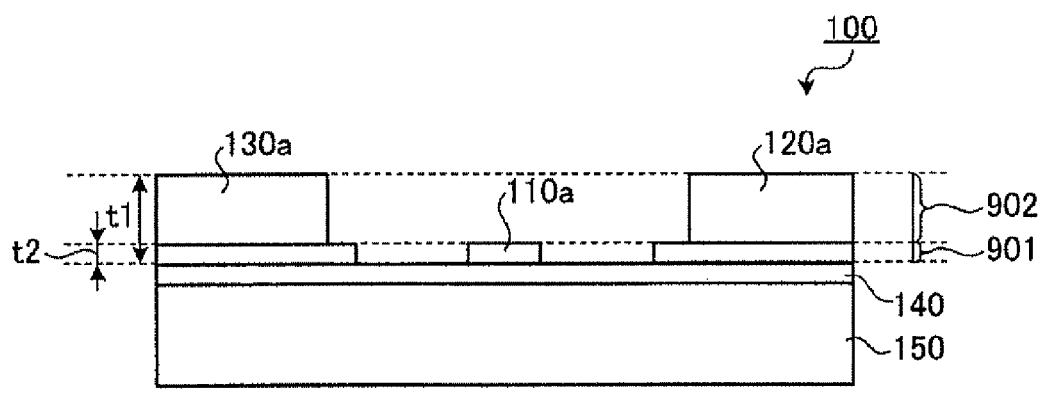
FIG. 9 is a cross-sectional diagram of line E-E in FIG. 8.

FIG. 8 is a plan view showing part of an optical modulator according to a modification 3 of the embodiment. FIG. 9 is a cross-sectional diagram of line E-E in FIG. 8. In FIG. 8 and FIG. 9, the same symbols are used to indicate a similar configuration to that indicated in FIG. 6 and FIG. 7. The optical modulator 100 according to the present modification is formed so that at least some part of the signal pad 110a is thinner than the electrodes of the interaction area with the parallel waveguide 162a. Thus, thick portions and thin portions of the signal electrode 110, the ground electrode 120, and the ground electrode 130 exist which are formed by performing patterning two times.

As shown in the optical modulator 100 of modification 3 in FIG. 9, the optical modulator is formed by: first, forming the first layers of the signal electrode 110, the ground electrode 120, and the ground electrode 130, which are indicated by symbol 901, on the buffer layer 140 of the substrate 150 with the thickness t2. Next, forming the second layers of the signal electrode 110, the ground electrode 120, and the ground electrode 130, which are indicated by symbol 902, on the first layers of signal electrode 110, the ground electrode 120, and the ground electrode 130, respectively, with the thickness t1−t2.

As shown in FIG. 8, second layers of the signal electrode 110, the ground electrode 120, and the ground electrode 130 are formed to be narrower than first layers of the corresponding electrodes, the signal electrode 110, the ground electrode 120, or the ground electrode 130, respectively. By this configuration, it is possible to prevent the second layers of the electrodes from becoming wider than the first layers of the corresponding electrodes, for the signal electrode 110, the ground electrode 120, or the ground electrode 130, in the cases when patterning mask alignment shifting occurs or when electrodes swells in the process of making electrodes, for example.

Therefore, in the optical modulator 100 according to the modification 3 of the embodiment, it is possible to prevent the second layers of the electrodes from becoming wider than the first layers of the corresponding electrodes, for the signal electrode 11, the ground electrode 120, or the ground electrode 130, and thus to prevent the gap S from changing, and to prevent the characteristics from significantly deteriorating.

For example, it is preferable to form the second layers of the electrodes to be formed 1 micrometer or more inner than the first layers of the corresponding electrodes, for the signal electrode 110, the ground electrode 120, or the ground electrode 130, as shown by symbol 801 in Fig.). This can also be applied to the optical modulator 100 according to the embodiment or the modification 1 of the embodiment.

Figure 10:
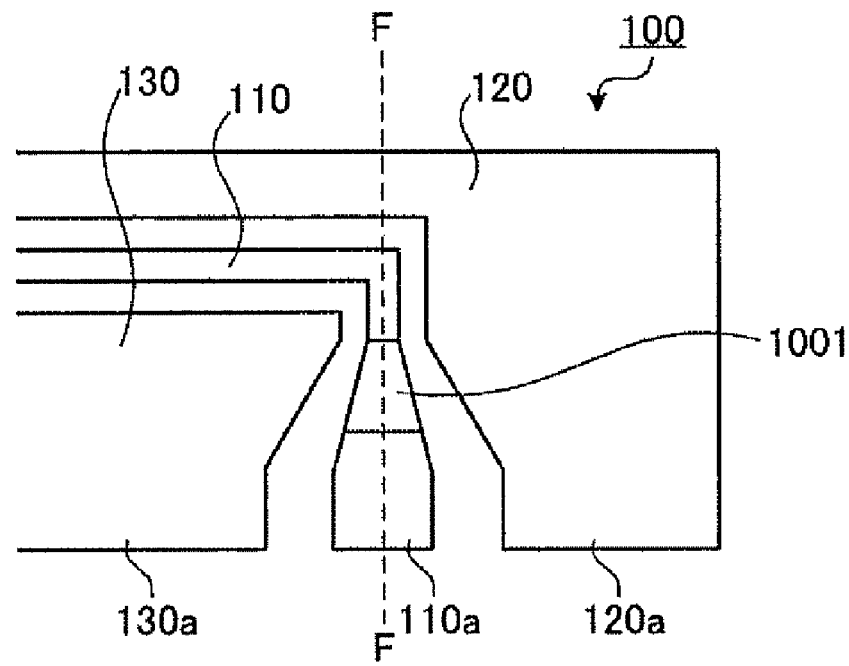
FIG. 10 is a plan view showing part of an optical modulator according to a modification 4 of the embodiment.
Figure 11:
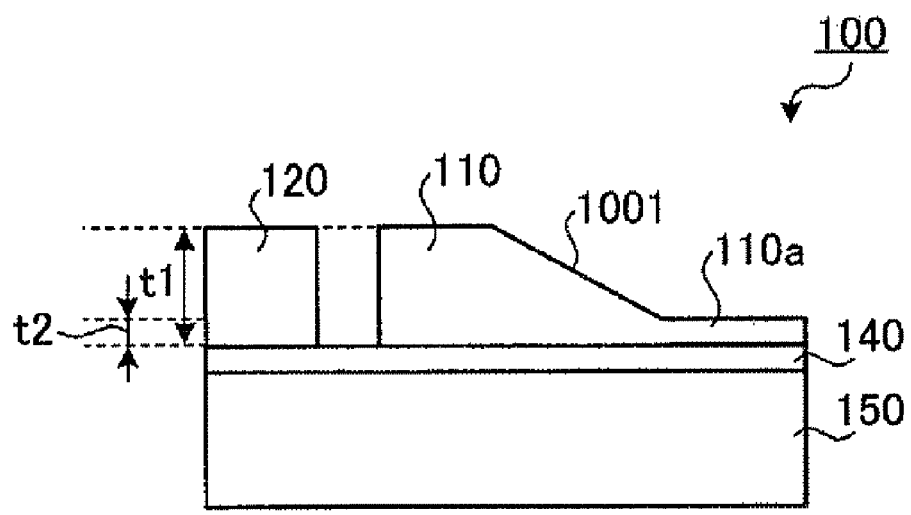
FIG. 11 is a cross-sectional diagram of line F-F in FIG. 10.

FIG. 10 is a plan view showing part of an optical modulator 100 according to a modification 4 of the embodiment. FIG. 11 is a cross-sectional diagram of line F-F in FIG. 10. In FIG. 10 and FIG. 11, the same symbols are used to indicate a similar configuration to that indicated in FIG. 4 and FIG. 5. As shown in FIG. 10 and FIG. 11, in the optical modulator 100 of modification 4, a slanting part 1001 is formed so that the thickness of the signal pad 110a continuously decreases as it separates from the interaction area with the parallel waveguide 162a.

In order to form the signal pad 110a with its thickness varying continuously, it can be used to apply a method of changing the film forming speed of the plating for specific area, for example. By continuously changing the thickness of the signal pad 110a, impedance mismatches in the signal pad 110a can be suppressed. This modification 4 of the embodiment can also be applied to the optical modulator 100 according to the embodiment, modification 2 or modification 3 of the embodiment.

Figure 12:
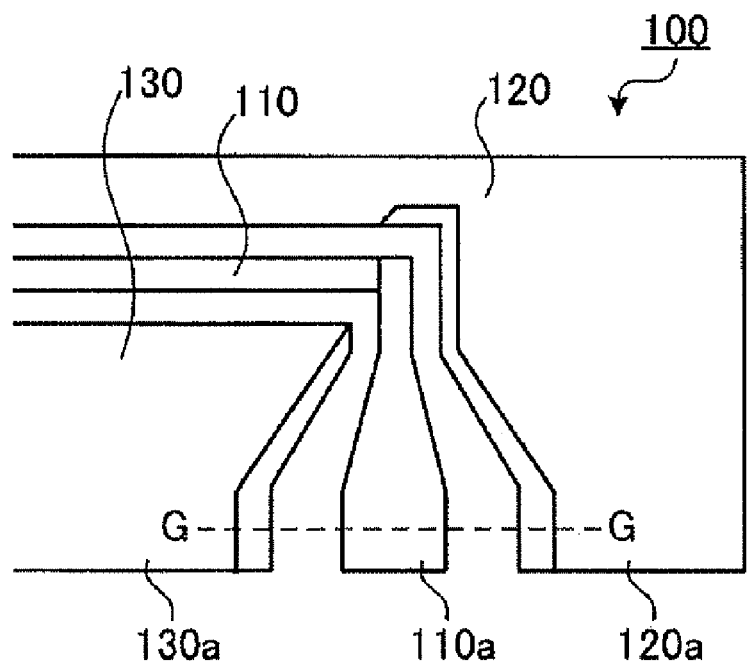
FIG. 12 is a plan view showing part of an optical modulator according to a modification 5 of the embodiment.
Figure 13:
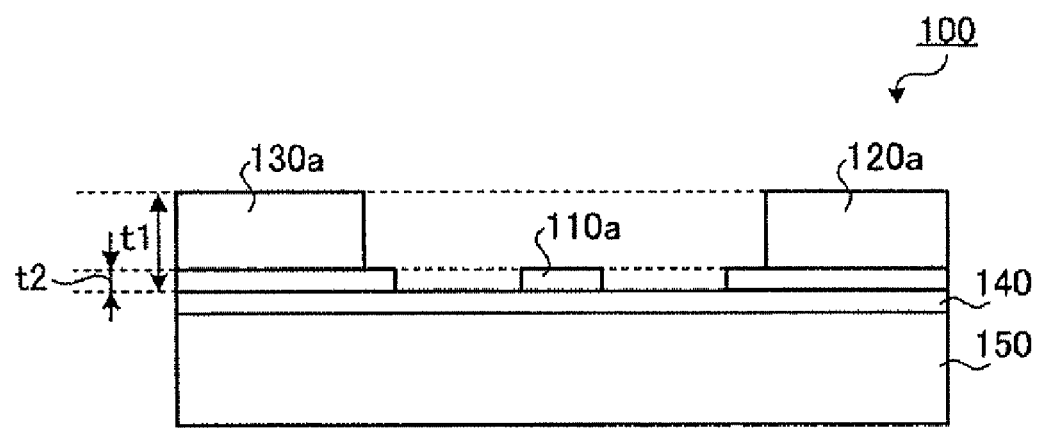
FIG. 13 is a cross-sectional diagram of line G-G in FIG. 12.

FIG. 12 is a plan view showing part of an optical modulator 100 according to a modification 5 of the embodiment. FIG. 13 is a cross-sectional diagram of line G-G in FIG. 12. In FIG. 12 and FIG. 13, the same symbols are used to indicate a similar configuration to that indicated in FIG. 6 and FIG. 7. As shown in FIG. 12 and FIG. 13, in the optical modulator 100 of modification 5, the thickness of the entire portion of the signal electrode 110 that is not the interaction area is formed to be less than the thickness of the signal electrode in the interaction area.

Also, the thickness of the entire portion of the ground electrode 120 and the ground electrode 130 that is not the interaction area is formed to be less than the thickness of the ground electrodes in the interaction area. By this configuration, it is thereby possible to design a small gap in the portion of the signal electrode 110, the ground electrode 120, and the ground electrode 130 that is not the interaction area. Thus, in the optical modulator 100 according to the modification 5 of the embodiment, it is possible to further reduce radiation loss. Using this configuration is preferable when there is a preference to reduce radiation loss over matching characteristic impedance.

Figure 14:
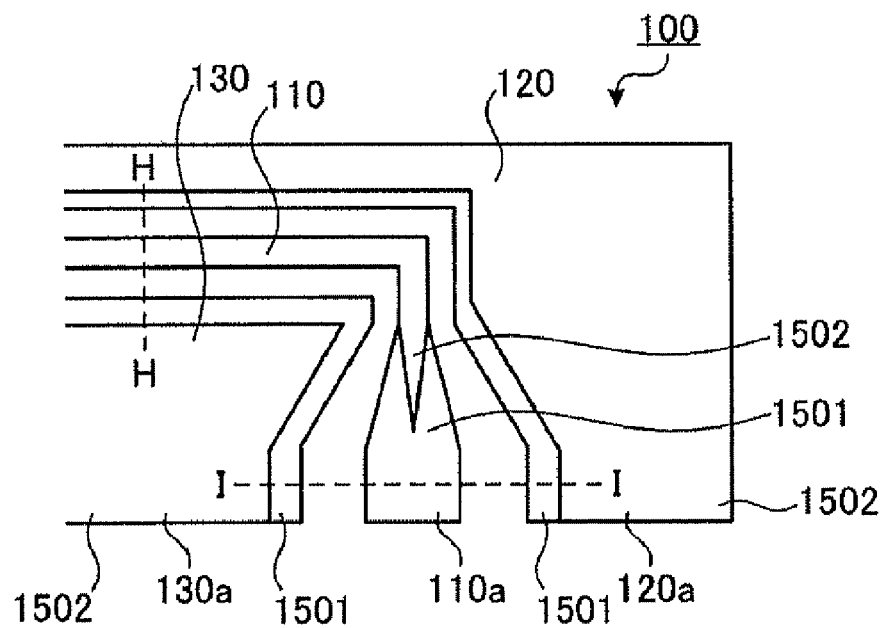
FIG. 14 is a plan view showing part of an optical modulator according to a modification 6 of the embodiment.
Figure 15:
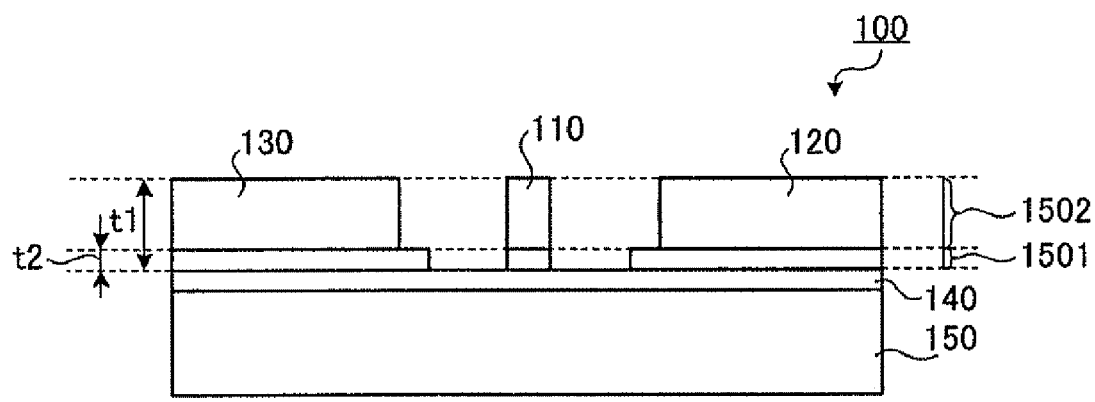
FIG. 15 is a cross-sectional diagram of line U-U in FIG. 14.
Figure 16:
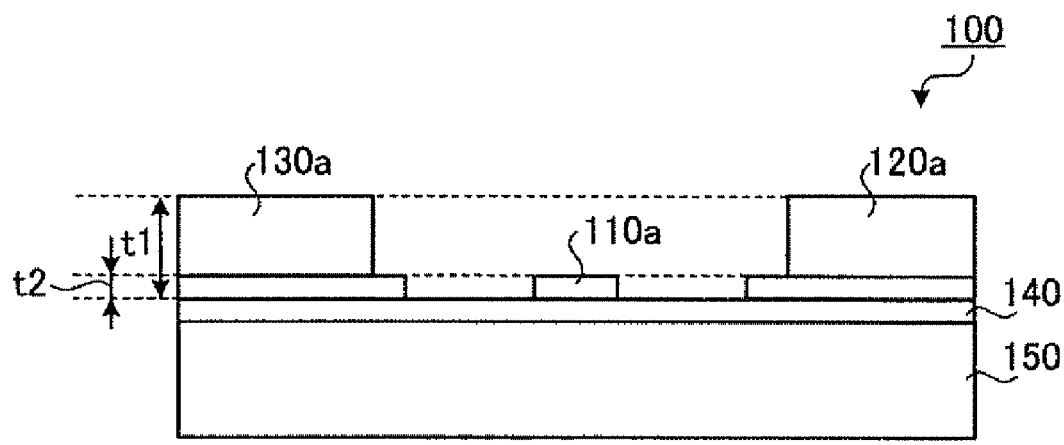
FIG. 16 is a cross-sectional diagram of line I-I in FIG. 14.

FIG. 14 is a plan view showing part of an optical modulator according to a modification 6 of the embodiment. FIG. 15 is a cross-sectional diagram of line H-H in FIG. 14. FIG. 16 is a cross-sectional diagram of line I-I in FIG. 14. In FIG. 14 through FIG. 16, the same symbols are used to indicate a similar configuration to that indicated in FIG. 6 and FIG. 7. As shown in FIG. 15, for the signal electrode 110, the ground electrode 120, and the ground electrode 130, electrodes in the interaction area are formed divided into two layers.

First, for the signal electrode 110, the ground electrode 120, and the ground electrode 130, the first layer of the electrodes indicated by symbol 1501 are formed on the buffer layer 140 of the substrate 150 with the thickness t2. Next, the second layers of the electrodes indicated by symbol 1502 are formed on the first layers of the corresponding electrodes with the thickness t1−t2.

Also, the second layers of the ground electrode 120 and ground electrode 130 are formed on the inner side of the ground electrode 120 or ground electrode 130 of the first layer. The part of the signal electrode 110 in a proximity to the ground electrode 120 and the ground electrode 130 is formed to be thinner than other portions, thereby making it possible to adjust the impedance or the execution refraction index of the microwaves.

Also, as shown in FIG. 15 and FIG. 16, the thickness of the thinner portion of the electrodes, for the signal pad 110a, the ground pad 120a, or the ground pad 130a, is t2. Also, the thickness of the first layers of the electrodes in the interaction area, for the ground electrode 120 or ground electrode 130, is t2. Thus, the thinner portion of the electrodes, for the portion of the signal pad 110a, the ground pad 120a, or the ground pad 130a, and the first layers of the electrodes in the interaction area, for the ground electrode 120 and the ground electrode 130, can be created during a single patterning.

In this way, it is possible to manufacture the signal electrode 110, the ground electrode 120, and the ground electrode 130 through two processes: the first film forming process for forming the thinner portion, for the signal pad 110a, the ground pad 120a, and the ground pad 130a, and the first layers of the electrodes in the interaction area, for the ground electrode 120 and the ground electrode 130; and the second film forming process for forming the thicker portion, for the signal pad 110a, the ground pad 120a, and the ground pad 130a, and the second layers of the electrodes in the interaction area, for the ground electrode 120 and the ground electrode 130.

Consequently, in the optical modulator 100 according to the modification 6 of the embodiment, the process of manufacturing the optical modulator 100 can be simplified. Modification 6 of the optical modulator 100 can be applied to the optical modulator 100 according to the embodiment, modification 1 or other modifications of the embodiment.

Figure 17:
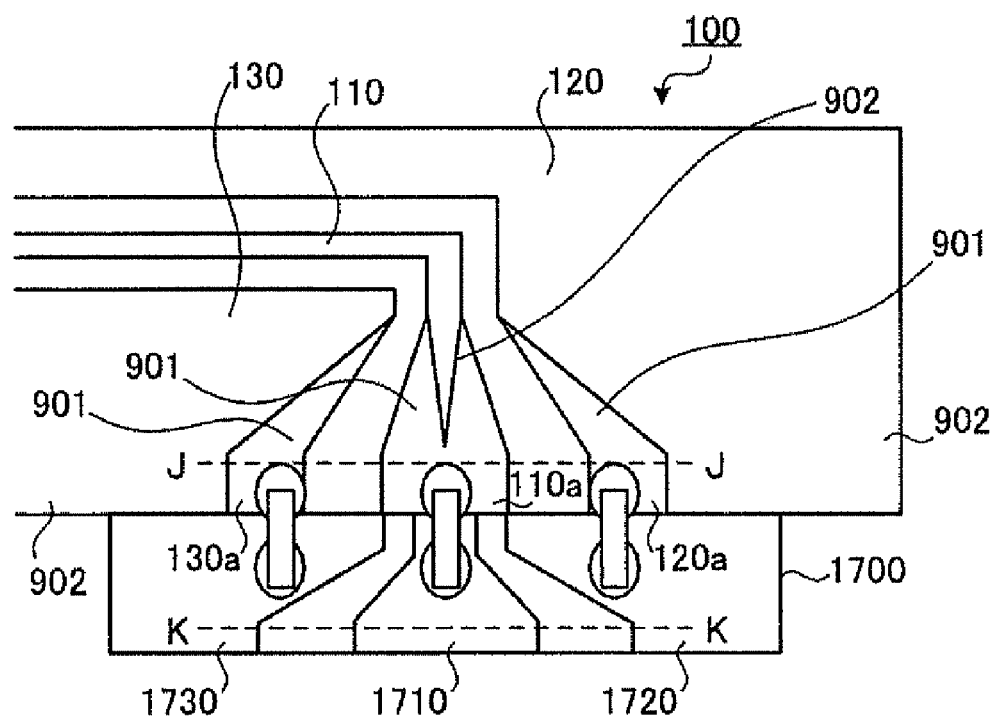
FIG. 17 is a plan view showing part of an optical modulator according to a modification 7 of the embodiment.
Figure 18:
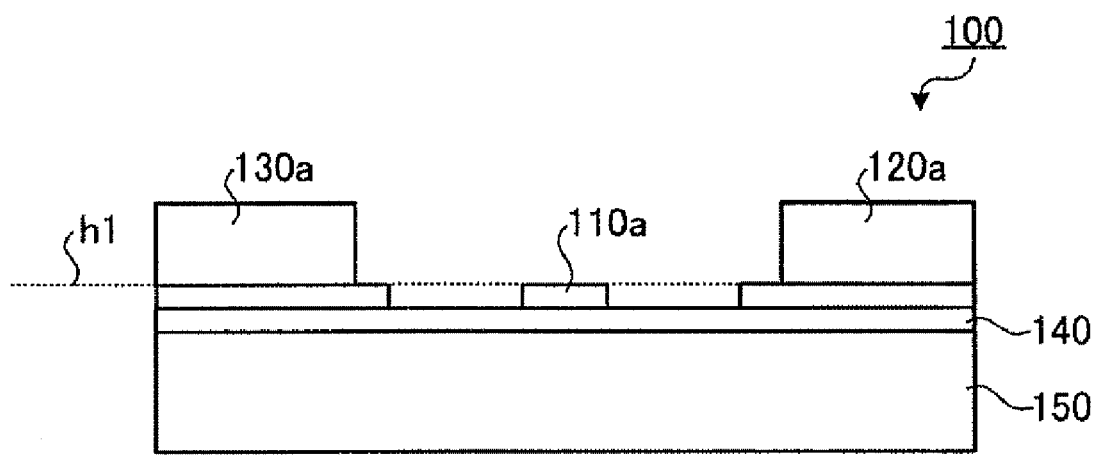
FIG. 18 is a cross-sectional diagram of line J-J in FIG. 17.
Figure 19:
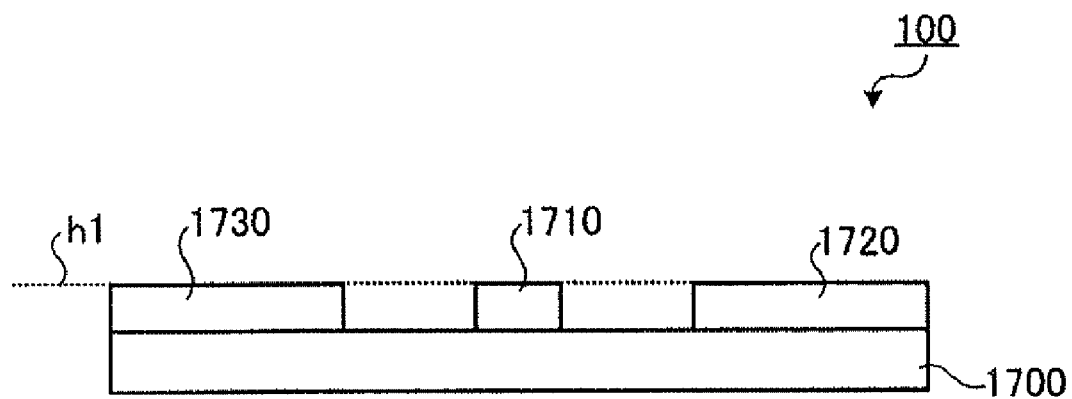
FIG. 19 is a cross-sectional diagram of line K-K in FIG. 17.

FIG. 17 is a plan view showing part of an optical modulator according to a modification 7 of the embodiment. FIG. 18 is a cross-sectional diagram of line J-J in FIG. 17. FIG. 19 is a cross-sectional diagram of line K-K in FIG. 17. In FIG. 17 through FIG. 19, the same symbols are used to indicate a similar configuration to that indicated in FIG. 8 and FIG. 9. As shown in FIG. 17, the optical modulator 100 of the modification 7 further has a relay substrate 1700 for relaying a connection between: the signal pad 110a, the ground pad 120a, and the ground pad 130a; and the signal line and ground line of another circuit.

The relay substrate 1700 has a signal line 1710, a ground line 1720, and a ground line 1730. The signal line 1710 is connected to the signal pad 110a by bonding such as wire bonding. The ground line 1720 is connected to the ground pad 120a by bonding such as wire bonding. The ground line 1730 is connected to the ground pad 130a by bonding such as wire bonding.

As shown in FIG. 18, the height of the thinner portion is h1, for the signal pad 110a, the ground pad 120a, and the ground pad 130a. As shown in FIG. 19, the height of the signal line 1710, the ground line 1720 and the ground line 1730 of the relay substrate 1700 is h1, the same height as that of the thinner portion of the signal pad 110a, the ground pad 120, or the ground pad 130a. Thus, the signal line 1710, the ground line 1720, and the ground line 1730 can be connected to the portion with same height at the signal pad 110a, the ground pad 120a, or the ground pad 130a.

Therefore, in the optical modulator 100 of modification*according to the embodiment, the task of wire bonding the signal line 1710, the ground line 1720, and the ground line 1730 to the signal pad 110a, the ground pad 120a, and the ground pad 130a is simplified. Modification 7 of the optical modulator 100 can be applied in the optical modulator 100 according to the embodiment, modification 1 of the optical modulator 100, or any other type of optical modulator 100.

Figure 20:
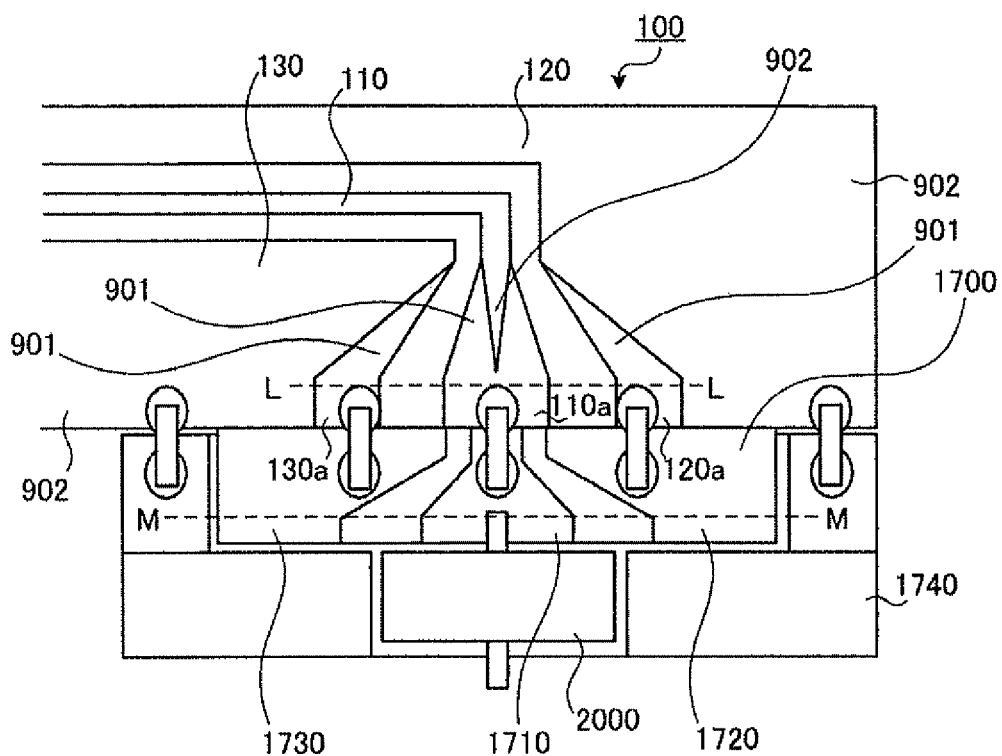
FIG. 20 is a plan view showing part of an optical modulator according to a modification 8 of the embodiment.
Figure 21:
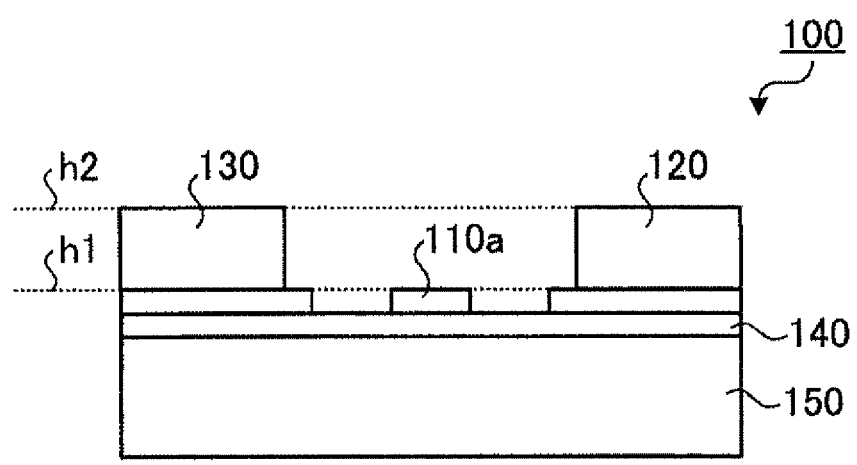
FIG. 21 is a cross-sectional diagram of line L-L in FIG. 20.
Figure 22:
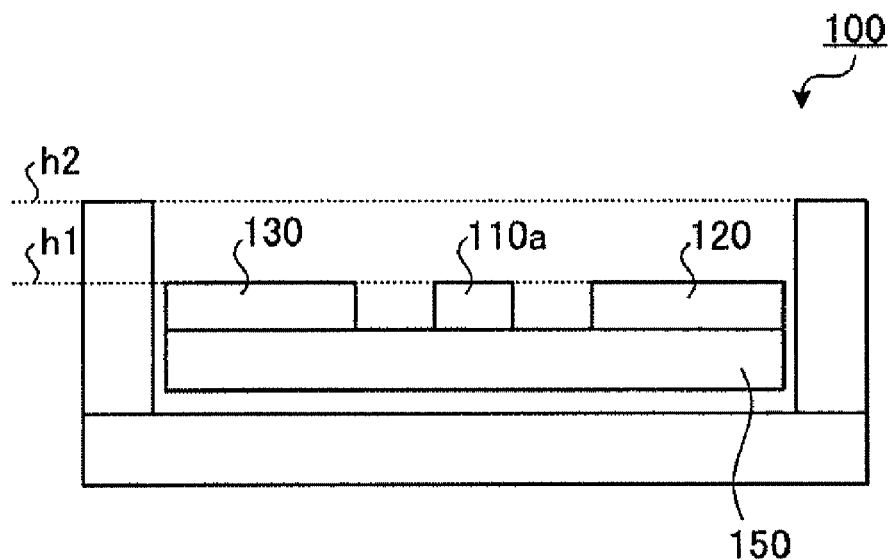
FIG. 22 is a cross-sectional diagram of line M-M in FIG. 20.

FIG. 20 is a plan view showing part of an optical modulator according to a modification 8 of the embodiment. FIG. 21 is a cross-sectional diagram of line L-L in FIG. 20. FIG. 22 is a cross-sectional diagram of line M-M in FIG. 20. In FIG. 20 through FIG. 22, the same symbols are used to indicate a similar configuration to that indicated in FIG. 17 through FIG. 19. As shown in FIG. 20, the relay substrate 1700 in the optical modulator 100 of modification 8 further has a chassis 1740. Symbol 2000 indicates a drive circuit of the optical modulator 100, having a coaxial structure, which connects to the optical modulator 100 by way of the relay substrate 1700.

The chassis 1740 is connected to the ground electrode 120 and the ground electrode 130 of the optical modulator 100 by bonding such as wire bonding. Thus, the chassis 1740 becomes a part of the ground electrode in the optical modulator 100, and thereby further increasing the impedance at the signal pad 110a.

As shown in FIG. 21, the height of the thicker portion is h2, for the signal pad 110a, the ground pad 120a, and the ground pad 130a. As shown in FIG. 22, the height of the portion in the chassis 1740 of the relay substrate 1700 that connects to the ground electrode 120 or the ground electrode 130 is h2, the same height as that of the thicker portion of the signal pad 110a, the ground pad 120, and the ground pad 130a.

Therefore, the task of wire bonding the chassis 1740 of the relay substrate 1700 to the thicker portion of the signal pad 110a, the ground pad 120a, and the ground pad 130a is simplified. Modification 8 of the optical modulator 100 can be applied to the optical modulator 100 according to the embodiment, modification 1 or any other types of modifications.

Figure 23:
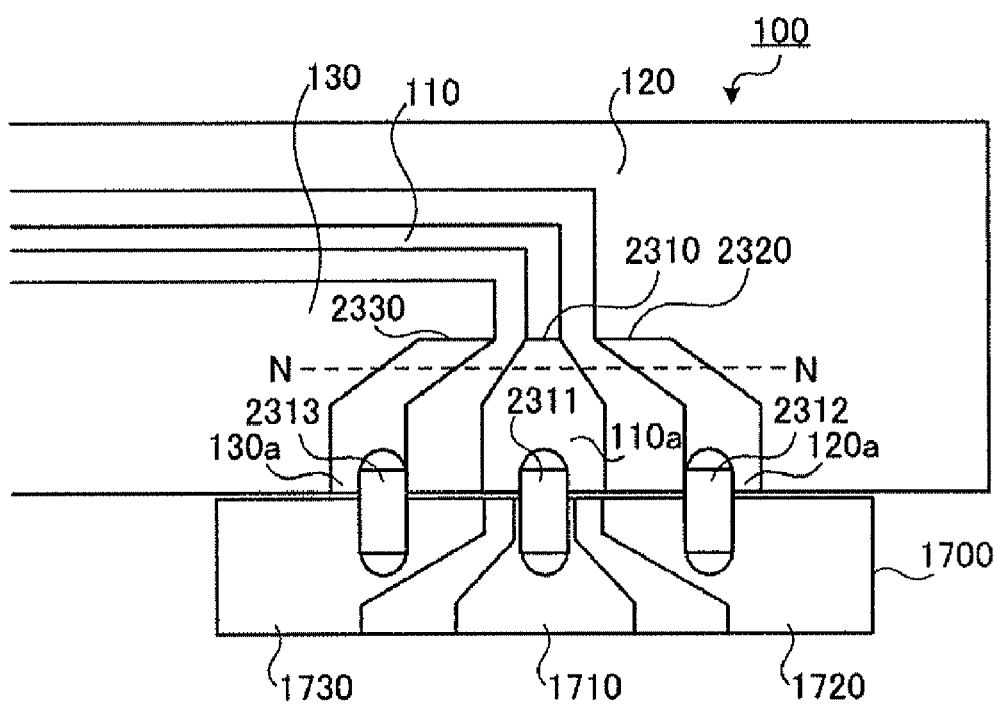
FIG. 23 is a plan view (part 1) showing part of an optical modulator according to a modification 9 of the embodiment.
Figure 24:
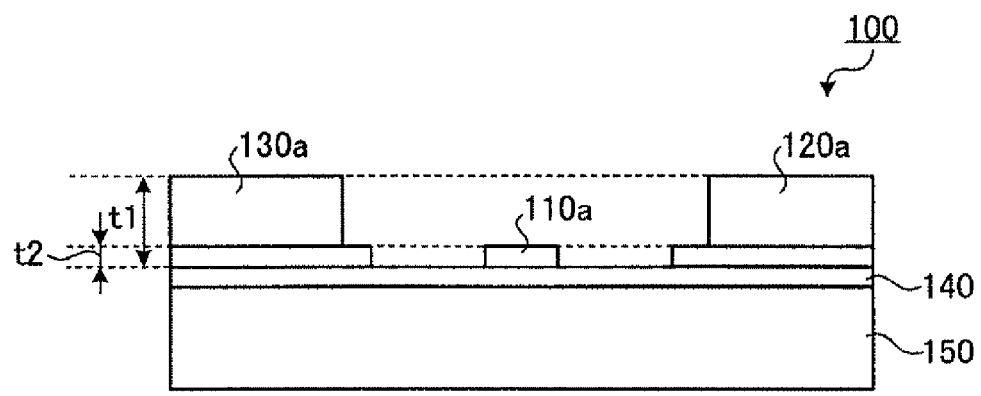
FIG. 24 is a cross-sectional diagram of line N-N in FIG. 23.
Figure 25:
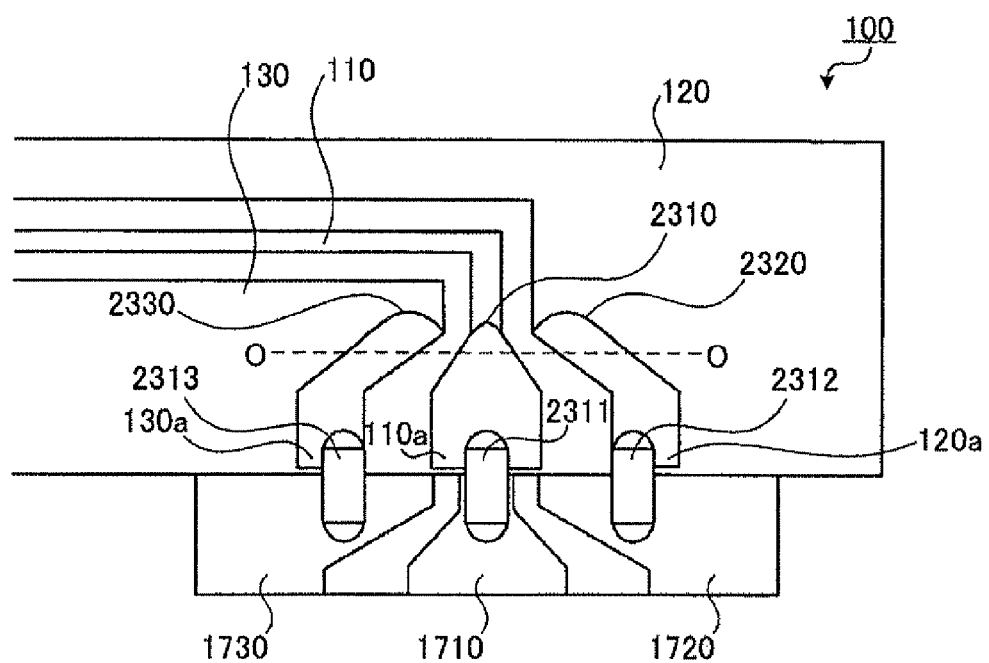
FIG. 25 is a plan view (part 2) showing part of an optical modulator according to a modification 9 of the embodiment.
Figure 26:
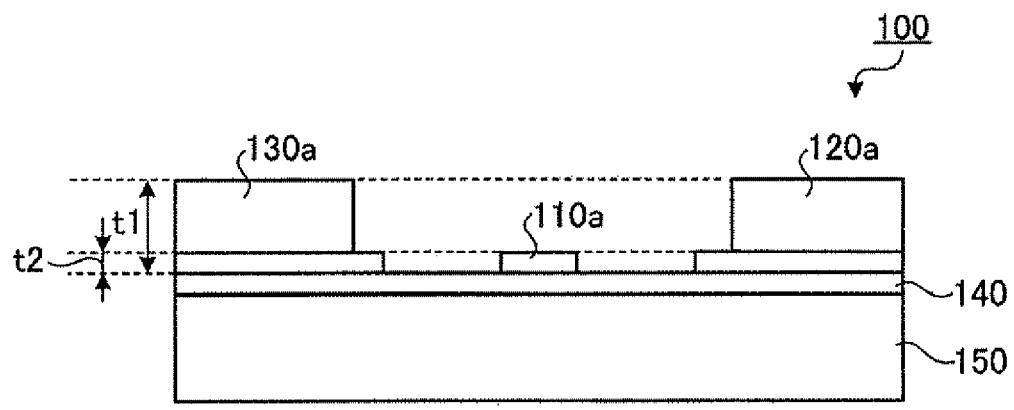
FIG. 26 is a cross-sectional diagram of line O-O in FIG. 25.

FIG. 23 is a first plan view showing part of an optical modulator according to a modification 9 of the embodiment. FIG. 24 is a cross-sectional diagram of line N-N in FIG. 23. FIG. 25 is a second plan view showing the part of the optical modulator according to the modification 9 of the embodiment. FIG. 26 is a cross-sectional diagram of line O-O in FIG. 25. In FIG. 23 through FIG. 26, the same symbols are used to indicate a similar configuration to that indicated in FIG. 17 through FIG. 19.

As shown in FIG. 23 and FIG. 24, the relay substrate 1700 in the optical modulator 100 of modification 9 is connected to the optical modulator 100 by gold ribbon, gold wire or other bonding. A signal line 1710 of the relay substrate 1700 is connected to the signal pad 110a by a gold ribbon 2311. The ground line 1720 is connected to the ground pad 120a by a gold ribbon 2312. The ground line 1730 is connected to the ground line 130a by a gold ribbon 2313.

When connecting the relay substrate 1700 to the optical modulator 100 by gold ribbon, gold wire or other bonding, solder or conductor paste is used in the connecting portion. The boundary 2310 at which the thickness of the signal electrode 110 starts changing, the boundary 2320 at which the thickness of the ground electrode 120 starts changing, and the boundary 2330 at which the thickness of the ground electrode 130 starts changing are nearly parallel to the end of the substrate 150 where the signal pad 110a is provided.

Therefore, in the optical modulator 100 according to the modification 9 of the embodiment, the boundaries 2310, 2320, and 2330 form a wall, and thereby prevent excess flowing of the solder or conductor paste used in the gold ribbon or the gold wire. Modification 9 of the optical modulator 100 can be applied to the optical modulator 100 according to the embodiment, modification 1, or any other modifications of the embodiments.

Also, as shown in FIG. 25, the boundaries 2310, 2320, and 2330 can form a concave curve at the end of the substrate 150 where the signal pad 110a is provided. The boundaries 2310, 2320, and 2330 form a wall, and thereby prevent excess flowing of the solder or conductor paste used in the gold ribbon or the gold wire. Furthermore, because the solder or conductor paste accumulates in the concave part of the boundaries 2310, 2320, and 2330, the excess flowing of solder or conductor paste is prevented more effectively.

Also, as shown in FIG. 23 and FIG. 25, the boundaries 2310, 2320, and 2330 can also be formed nearly equidistantly from the end provided by the signal pad 110a in the substrate 150. Therefore, the signal electrode 110, the ground electrode 120, and the ground electrode 130 can be connected to the relay substrate 1700 under the same conditions, such as conditions for gold ribbon length or solder amount.

Figure 27:
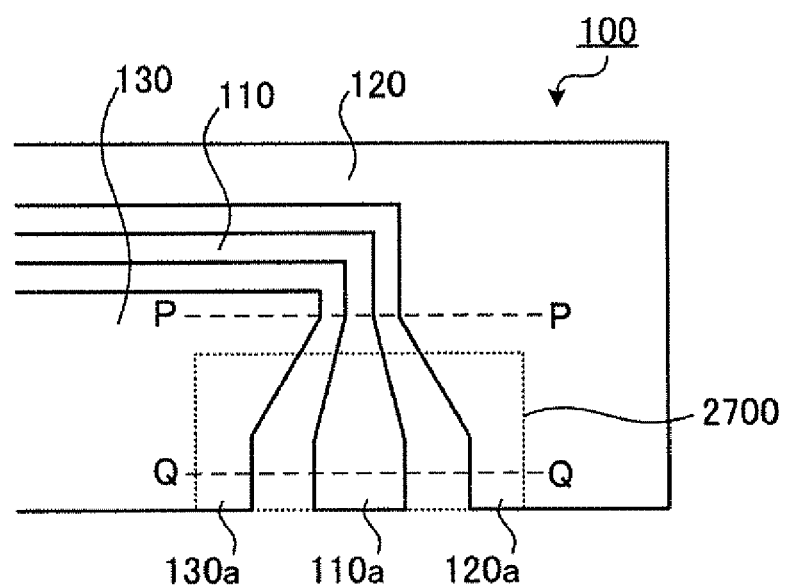
FIG. 27 is a plan view showing part of an optical modulator according to a modification 10 of the embodiment.
Figure 28:
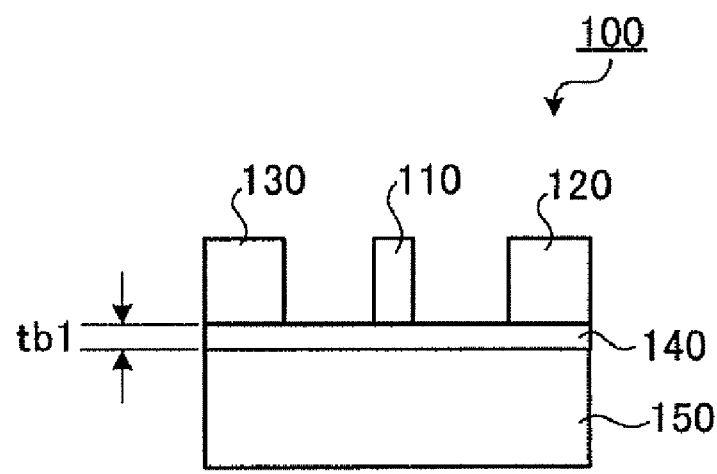
FIG. 28 is a cross-sectional diagram of line P-P in FIG. 27.
Figure 29:
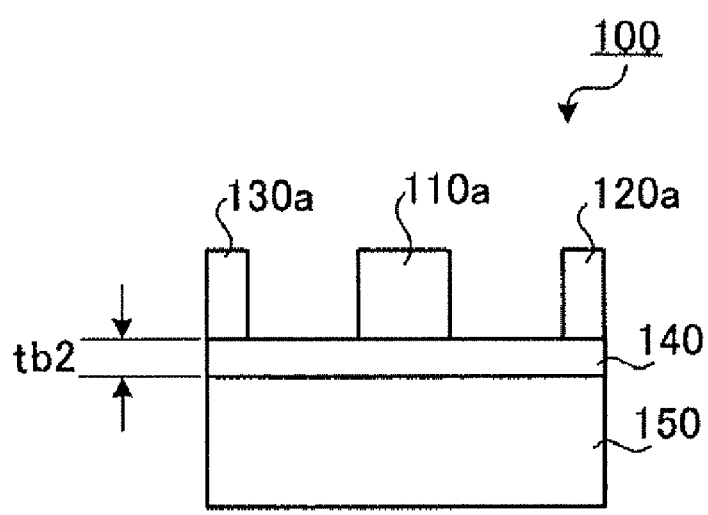
FIG. 29 is a cross-sectional diagram of line Q-Q in FIG. 27.

FIG. 27 is a plan view showing part of an optical modulator according to a modification 10 of the embodiment. FIG. 28 is a cross-sectional diagram of line P-P in FIG. 27. FIG. 29 is a cross-sectional diagram of line Q-Q in FIG. 27. In FIG. 27 through FIG. 29, the same symbols are used to indicate a similar configuration to that indicated in FIG. 1 through FIG. 3. In the optical modulator 100 according to modification 10 of the embodiment, the thickness of a part of the buffer layer 140 is changed with the thickness of the signal pad 110a, the electrode pad 120a, and the electrode pad 130a unchanged.

As shown in FIG. 27, in the optical modulator 100 of modification 110 the buffer layer 140 has an area 2700 that is thicker than the buffer layer 140 in the proximity of the interaction area. The area 2700 is an area including the proximity of the signal pad 110a. As shown in FIG. 28, the thickness of the buffer layer 140 in the proximity of the interaction area is tb1. As shown in FIG. 29, the thickness of the buffer layer 140 in the area 2700 including the proximity of the signal pad 110a is tb2 (>tb1).

In order to form the buffer layer 140 having thickness of tb1 in the proximity of the interaction area and also having thickness of tb2 in the area 2700, with tb1 and tb2 be different, there is a method of forming the buffer layer 140 by performing patterning two times, for example. By the method, first, the buffer layer 140 is formed on one side of the substrate 150 in the first patterning, and the buffer layer 140 of the area 2700 is further formed in the second patterning.

By this configuration, the impedance can be increased, up to 50 ohm for example, in the signal pad 110a without increasing the gap S, the gap between the signal pad 110a and the ground pad 120a, or the ground pad 130a. Therefore, in the optical modulator 100 according to the modification 10 of the embodiment, while facilitating connections to the drive circuit, the characteristic impedance can be matched without increasing the radiation loss even when operating at a high speed.

Modification 10 can also be applied to an optical modulator 100 according to the embodiment, modification 1 or other modifications of the embodiment. For example, while forming said area 2700 in the buffer layer 140, a configuration changing the thickness of a part of the signal pad 110a, the electrode pad 120a, and the electrode pad 130a can also be used.

It is preferable to apply the shape in the proximity of the signal pad 110a for each aforementioned optical modulator 100 to both ends of the signal electrode 110 of the optical modulator 100. Among other benefits, forming both sides of the signal electrode 110 to have the same shape makes it possible to match characteristic impedance in the signal pad 110a.

Figure 30:
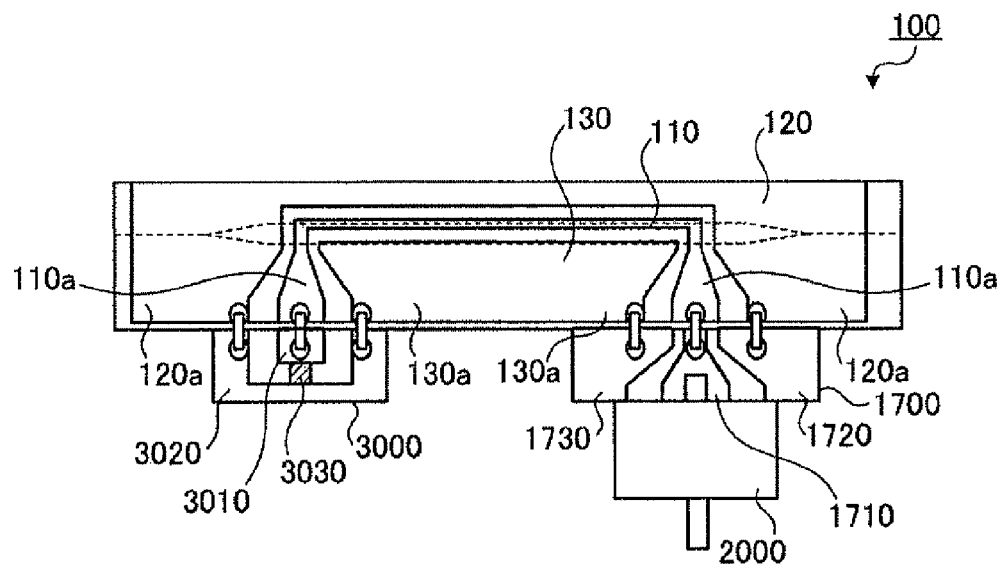
FIG. 30 is a plan view showing a termination device connected to an optical modulator according to the embodiment.

FIG. 30 is a plan view showing a termination device connected to an optical modulator according to the embodiment of the present invention. A termination device 3000 is connected to the end on the opposite side (output side) of the end to which the relay substrate 1700 is connected at the signal electrode 110. The termination device 3000 is connected to the end of the signal electrode 110 by wire bonding or another means. The termination device 3000 has the signal electrode 3010 and the ground electrode 3020. The signal electrode 3010 is connected to the end of the signal electrode 110. The ground electrode 3020 is connected to the ground electrode 120 and the ground electrode 130.

The signal electrode 3010 and the ground electrode 3020 are connected to each other by way of a resistance 3030, with 50 ohm for example. The height of the portion connected to the end of the signal electrode 3010 in the termination device 3000 is matched to the height of the thinner end portion of the signal electrode 110. Thereby, the task of wire bonding the termination device 3000 to the end of the signal electrode 110 is facilitated.

Figure 31:
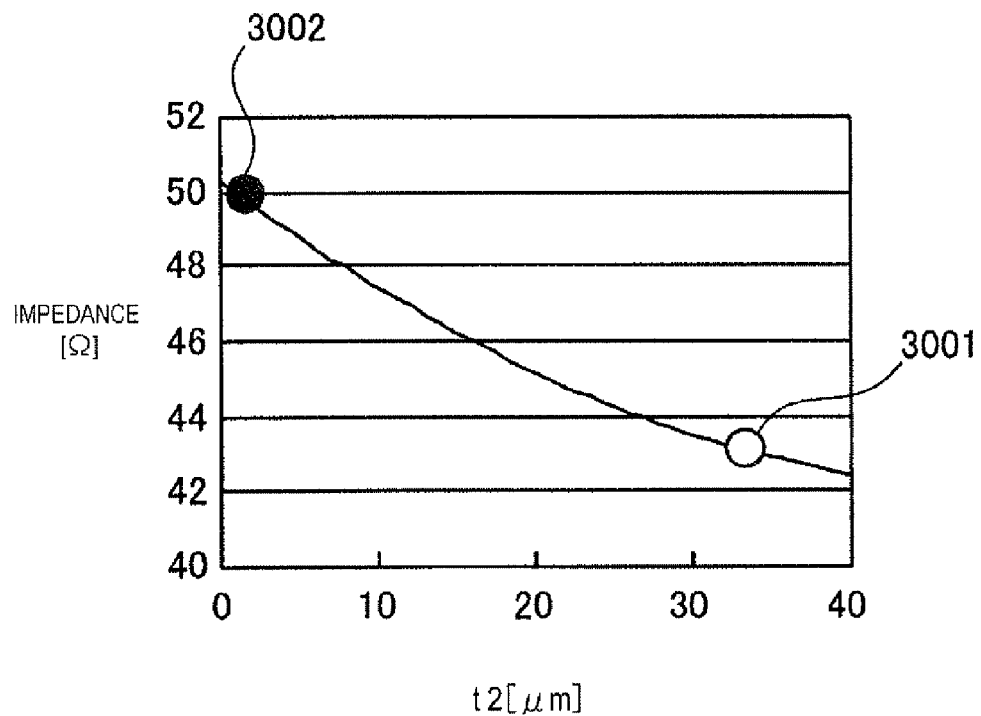
FIG. 31 is a diagram showing the impedance of an optical modulator according to the embodiment.

FIG. 31 is a diagram showing the impedance of an optical modulator according to the embodiment FIG. 31 shows the impedance of an optical modulator 100 according tot the modification 2 (see FIG. 6 and FIG. 7) of the embodiment. The abscissa axis shows the thickness t2 [micrometer] for the signal pad 110a of the optical modulator 100, and the proximity of the signal pad 110a in the ground pad 120a and the ground pad 130a. The ordinate axis shows calculated impedance [ohm] at the signal pad 110a of the optical modulator 100 using the finite element method.

As shown in FIG. 31, the impedance at the signal pad 110a increases as the thickness t2 is decreased. For example, if t2 is the same 34 micrometer thickness as t1 (if the thickness of the signal pad 110a is not changed) as is the case previously, the impedance at the signal pad 110a becomes 43 ohm as shown by symbol 3001. In contrast, if t2 is 1 micrometer (if the thickness of the signal pad 110a is decreased), the impedance at the signal pad 110a becomes 50 ohm as shown by symbol 3002.

Figure 32:
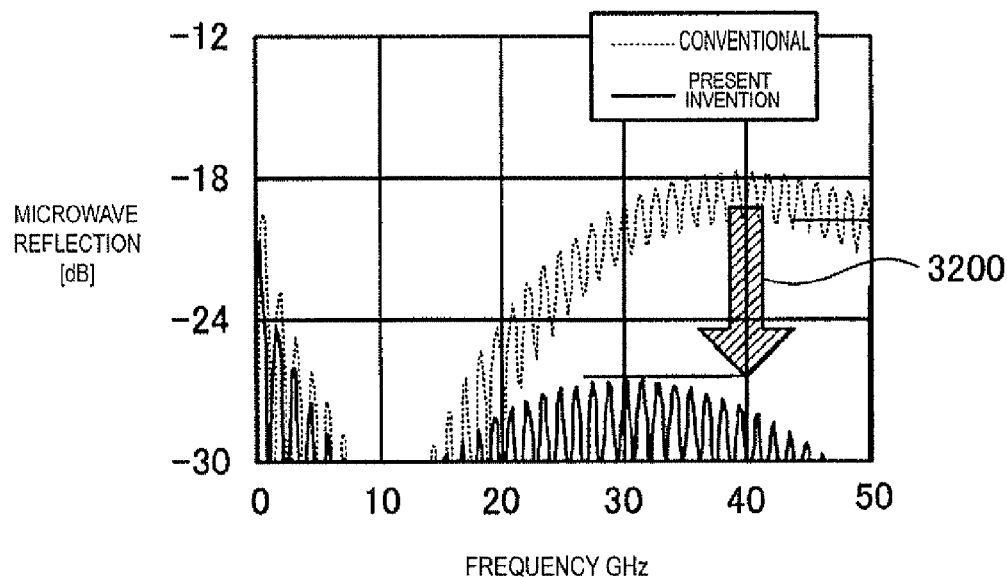
FIG. 32 is a diagram showing the reflection of microwaves in an optical modulator according to the embodiment.

FIG. 32 is a diagram showing the reflection of microwaves in an optical modulator according to the embodiment. In FIG. 32, the abscissa axis shows the frequency [0 Hz] of microwaves that are input/output by the optical modulator 100. The ordinate axis indicates the reflection [dB] of microwaves. The dotted line indicates the reflection of microwaves in a conventional optical modulator. The solid line indicates the reflection of microwaves in the optical modulator 100 according to the embodiment.

As shown in FIG. 32, the optical modulator 100 according to the embodiment has reduced reflection of microwaves compared to a conventional optical modulator. In the case of 40 GHz microwaves for example, when the impedance is increased from 43 ohm to 50 ohm by the present embodiment (see FIG. 31), the reflection of microwaves is reduced approximately 9 dB as shown by symbol 3200.

Figure 33:
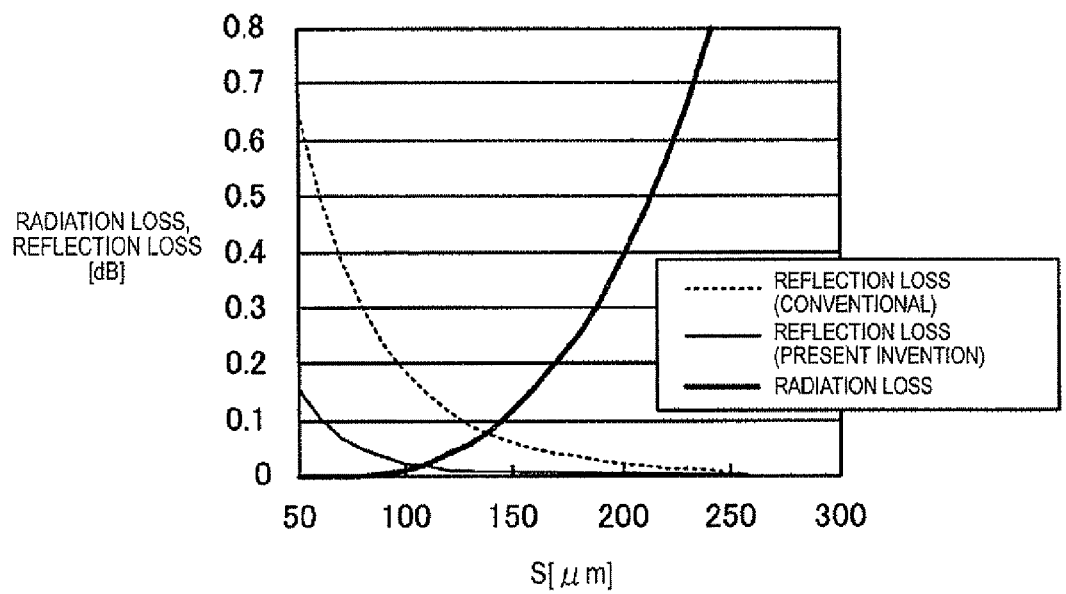
FIG. 33 is a diagram showing radiation loss and reflection loss in an optical modulator according to the embodiment.

FIG. 33 is a diagram showing the sum of radiation loss and reflection loss in an optical modulator according to the embodiment. In FIG. 33, the abscissa axis shows the gap S [micrometer] between the signal pad 110a of the optical modulator 100, and the ground pad 120a and the ground pad 130a (similar to FIG. 34). The ordinate axis shows the radiation loss and reflection loss [dB] in the optical modulator 100.

The dotted line indicates the reflection loss in a conventional optical modulator. The solid line indicates the reflection loss in the optical modulator 100 according to the embodiment. The bold line indicates the radiation loss in a conventional optical modulator and the optical modulator 100 according to the embodiment. As shown in FIG. 33, the optical modulator 100 according to the embodiment has reduced reflection loss compared to the conventional optical modulator.

Figure 34:
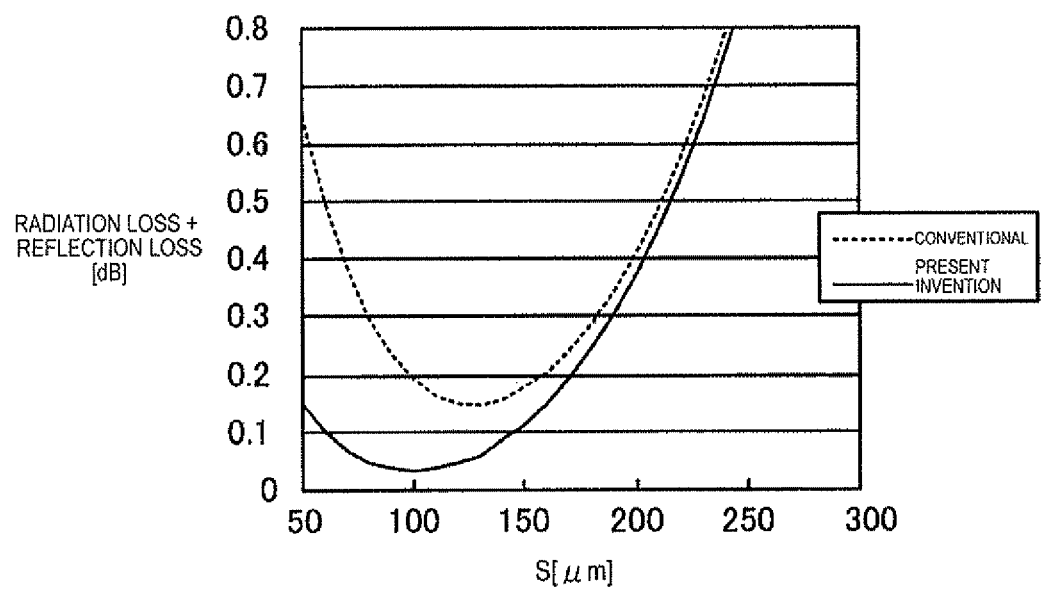
FIG. 34 is a diagram showing the sum of radiation loss and reflection loss in an optical modulator according to the embodiment.

FIG. 34 is a diagram showing the sum of radiation loss and reflection loss in an optical modulator according to the embodiment. In FIG. 34, the ordinate axis shows the sum of the radiation loss and reflection loss [dB] in the optical modulator 100. The dotted line indicates the sum of the radiation loss and reflection loss in a conventional optical modulator. The solid line indicates the sum of radiation loss and reflection loss in the optical modulator 100 according to the embodiment. As shown in FIG. 34, the optical modulator 100 according to the embodiment has a reduced sum of radiation loss and reflection loss compared to the conventional optical modulator.

Because reflection loss is significant in the case of conventional optical modulators, radiation loss and reflection loss is minimized by designing the gap S, the gap between the signal pad 3530a and ground electrodes 3540 or 3550, to be about 130 micrometer. On the other hand, because reflection loss is reduced in the optical modulator 100 according to the embodiment of the present invention, the gap S, the gap between the signal pad 110a and the ground pad 120a or the ground pad 30a, is designed to be about 100 micrometer so radiation loss and reflection loss is minimized.

As explained above, by making the thickness of at least one part of the signal pad provided at the end of the signal electrode less than the thickness of the electrodes in the interaction area, the optical modulator according to the embodiment can facilitate connections to the drive circuit while matching characteristic impedance without increasing radiation loss even when operating at a high speed. Therefore, the optical modulator according to the present embodiment can improve modulation performance.

Figure 35:
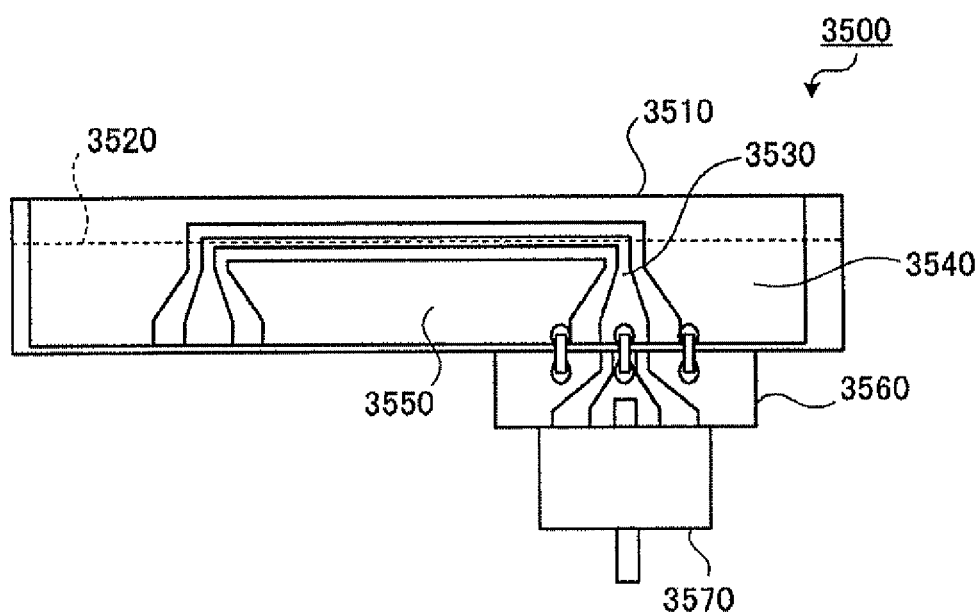
FIG. 35 is a plan view showing a conventional optical modulator.

In the aforementioned embodiment, the optical modulator is explained as a Mach-Zehnder modulator, but the optical modulator according to the present invention can also be applied as an optical waveguide electrodes formed on a substrate having an electro-optic effect. For example, the optical modulator according to the present invention can also be applied to an optical modulator 3500 like that shown in FIG. 35.

Although a few preferred embodiments of the present invention have been shown and described, it would be appreciated by those skilled in the art that changes may be made in these embodiments without departing from the principles and spirit of the invention, the scope of which is defined in the claim and their equivalents.

What is claimed is:

1. An optical modulator, comprising;
an optical waveguide in which input light propagates;
a signal electrode having an end portion in which signal microwave is input and having an interaction area in which the signal microwave interacts with the light propagating in the optical waveguide;
a connection pad having a first end at the end portion of the signal electrode and a second end opposite the first end; and,
a ground electrode forming a coplanar line with the signal electrode, wherein,
thickness of the first end of the connection pad is thinner than thickness of the second end of the connection pad.

2. The optical modulator according to claim 1, wherein, thickness of the ground electrode near the end portion is less than the thickness of the interaction area.

3. The optical modulator according to claim 2, wherein the thickness of the end portion of the signal electrode is less than the thickness of the interaction area.

4. The optical modulator according to claim 3, wherein the thickness of the end portion is 1 micrometer or greater.

5. The optical modulator according to claim 3, wherein the thickness of the ground electrode near the end portion is less than the thickness of the interaction area.

6. The optical modulator according to claim 5, wherein the thickness of the ground electrode near the end portion is the same as the thickness of the end portion of the signal electrode.

7. The optical modulator according to claim 6, wherein width of the ground electrode near the end portion is 100 micrometer or greater.

8. The optical modulator according to claim 1, wherein,
the signal electrode comprises a first layer signal electrode and a second layer signal electrode, the second layer signal electrode being formed on the first layer signal electrode,
the ground electrode comprises a first layer ground electrode and a second layer ground electrode, the second ground electrode being formed on the first layer signal electrode,
the first layer signal electrode is wider than the second layer signal electrode, and,
the first layer ground electrode is wider than the second layer ground electrode.

9. The optical modulator according to claim 8, wherein the second layer signal electrode and second layer ground electrode are each formed 1 micrometer or more to the inner side of the first layer signal electrode and first layer ground electrode, respectively.

10. The optical modulator according to claim 1, wherein a gap between the signal electrode and ground electrode changes continuously according to the width of the signal electrode.

11. The optical modulator according to claim 1, wherein the width of the portion of the signal electrodes or ground electrodes where the thickness of the electrode is less than the interaction area changes continuously according to the width of the signal electrode.

12. The optical modulator according to claim 1, wherein at least part of the thickness of the end portion continues to decrease as the distance from the interaction area increases.

13. The optical modulator according to claim 1, wherein the thickness of a portion of the signal electrode which is not the interaction area of the signal electrode and the thickness of the ground electrode near the portion are less than the thickness of the interaction area.

14. The optical modulator according to claim 1, wherein,
the ground electrode corresponding to the interaction area comprises a third layer ground electrode and a fourth layer ground electrode, the fourth layer ground electrode being formed on the third layer ground substrate,
the third layer ground substrate is wider than the fourth layer ground substrate, and
the thickness of the end portion is same as the thickness of the third layer ground electrode.

15. The optical modulator according to claim 1, further comprising a relay substrate having a signal line and a ground line and relaying connections between the end portion of the signal electrode and the signal line or the ground electrode and ground line of other circuits, wherein,
the height of the signal line in the relay substrate is same as the height of the end portion of the signal electrode.

16. The optical modulator according to claim 15, wherein
the relay substrate is housed in a chassis and connected to a portion of the ground electrode,
the thickness of the portion of ground electrode is larger than the ground electrode of other portion.

17. The optical modulator according to claim 1, wherein the boundaries where the thickness of the signal electrode and ground electrode start changing are formed nearly parallel to the end portion of the signal electrode at the end of the substrate.

18. The optical modulator according to claim 1, wherein the boundaries where the thickness of the signal electrode and ground electrode start changing are formed in a concave curve at the end portion of the signal electrode at the end of the substrate.

19. The optical modulator according to claim 17, wherein the boundaries where the thickness of the signal electrode and ground electrode start changing are formed nearly equidistantly from the end portion of the signal electrode at the end of the substrate.

20. The optical modulator according to claim 1, wherein the width of both ends of the signal electrode are greater than the width of the interaction area and at least part of the thickness of both ends of the signal electrode is less than the thickness of the interaction area.

21. The optical modulator according to claim 20, further comprising a resistance and a termination device, wherein,
the height of the portion connected to one end of the signal electrode in the termination device is same as the height of the portion where the thickness of one end of the signal electrode is less.

22. The optical modulator according to claim 1, further comprising:
a substrate having an electro-optic effect; and,
a buffer layer on the substrate, wherein,
the signal electrode and ground electrode are formed on the buffer layer, and
thickness of the buffer layer near the end portion of the signal electrode is greater than thickness of the buffer layer near the interaction area.

23. The optical modulator according to claim 1, wherein the gap between the end of the signal electrode and ground electrode is less than 130 micrometer.

24. The optical modulator according claim 1, wherein the gap between the end of the signal electrode and the ground electrode is 100 micrometer.

25. An apparatus comprising;
an optical waveguide in which input light propagates;
a signal electrode having an end portion in which signal microwave is input and having an interaction area in which the signal microwave interacts with the light propagating in the optical waveguide;
a connection pad having a first end at the end portion of the signal electrode and a second end opposite the first end; and
a ground electrode forming a coplanar line with the signal electrode,
wherein the apparatus is an optical modulator and thickness of the first end of the connection pad is thinner than thickness of the second end of the connection pad.

26. The optical modulator according to claim 1, wherein the thickness of the first end of the signal electrode is equal to thickness of the end portion of the signal electrode.

27. The apparatus according to claim 25, wherein the thickness of the first end of the signal electrode is equal to thickness of the end portion of the signal electrode.

28. The optical modulator according to claim 1, wherein the connection pad has a slanting part.

29. The optical modulator according to claim 1, wherein the connection pad has a slanting part and a flat part.

30. The apparatus according to claim 25, wherein the signal connection pad has a slanting part.

31. The apparatus according to claim 25, wherein the signal connection pad has a slanting part and a flat part.

* * * * *

UNITED STATES PATENT AND TRADEMARK OFFICE
CERTIFICATE OF CORRECTION

| | | |
|---|---|---|
| PATENT NO. | : 7,751,656 B2 | |
| APPLICATION NO. | : 12/025347 | |
| DATED | : July 6, 2010 | |
| INVENTOR(S) | : Masaki Sugiyama | |

It is certified that error appears in the above-identified patent and that said Letters Patent is hereby corrected as shown below:

Column 16, Line 19 in Claim 24, after "according" insert --to--.

Column 16, Line 46 in Claim 30, after "the" delete "signal".

Column 16, Line 48 in Claim 31, after "the" delete "signal".

Signed and Sealed this
Fourth Day of January, 2011

David J. Kappos
*Director of the United States Patent and Trademark Office*